(12) United States Patent
Hinque

(10) Patent No.: US 9,327,561 B2
(45) Date of Patent: *May 3, 2016

(54) COMPACT VALVE SYSTEM FOR SELF-INFLATING TIRE

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 411 days.

This patent is subject to a terminal disclaimer.

(21) Appl. No.: 14/013,894

(22) Filed: Aug. 29, 2013

(65) Prior Publication Data

US 2015/0059951 A1    Mar. 5, 2015

(51) Int. Cl.
*B60C 23/12*    (2006.01)

(52) U.S. Cl.
CPC ......... *B60C 23/12* (2013.01); *Y10T 152/10495* (2015.01)

(58) Field of Classification Search
CPC ........ B60C 23/10; B60C 23/12; B60C 23/004
USPC .......................................... 152/419, 423–426
See application file for complete search history.

(56) References Cited

U.S. PATENT DOCUMENTS

| | | | | |
|---|---|---|---|---|
| 3,978,880 | A * | 9/1976 | Crown | F17B 1/12 137/315.05 |
| 4,204,555 | A * | 5/1980 | Durling | B60T 15/54 137/102 |
| 4,316,479 | A * | 2/1982 | Franz | G05D 16/04 137/85 |
| 8,573,270 | B2 * | 11/2013 | Hinque | B60C 23/12 152/419 |
| 8,857,484 | B2 * | 10/2014 | Hinque | B60C 23/12 152/419 |
| 2011/0297245 | A1 * | 12/2011 | Chaffee | A47C 27/081 137/223 |
| 2015/0059949 | A1 * | 3/2015 | Hinque | B60C 23/12 152/450 |
| 2015/0059950 | A1 * | 3/2015 | Hinque | B60C 23/12 152/450 |

FOREIGN PATENT DOCUMENTS

| | | | | |
|---|---|---|---|---|
| EP | 2565060 | A1 | 3/2013 | |
| EP | 2746073 | A2 | 6/2014 | |
| EP | 2842774 | | * 3/2015 | .............. B60C 23/12 |

OTHER PUBLICATIONS

European Search Report for Application Serial No. EP14182069, dated Dec. 22, 2014.

* cited by examiner

*Primary Examiner* — Jason Bellinger
(74) *Attorney, Agent, or Firm* — June E. Rickey

(57) ABSTRACT

A tire having a tire cavity is disclosed, wherein the tire has a bi-directional pump assembly including a pump passageway having an inlet end and an outlet end, and being operative to allow a portion of the pump passageway near a tire footprint to substantially close and open the pump passageway. The tire includes a valve assembly having a valve housing, wherein a diaphragm is mounted in the valve housing forming an interior chamber, and wherein the diaphragm is responsive to the pressure of the tire cavity. The interior chamber has an inlet in fluid communication with outside air, and an outlet in fluid communication with inlet and outlet of the pump passageway. The diaphragm is positioned over the outlet and operative to open and close the outlet. A resilient member biases the diaphragm into the open position.

18 Claims, 23 Drawing Sheets

COMPACT VALVE SYSTEM FOR SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a tire having a pump and valve assembly. The tire has a tire cavity, and a first and second sidewall extending respectively from first and second tire bead regions to a tire tread region. The valve assembly has a valve housing having an interior chamber, wherein a diaphragm is mounted in the interior chamber, and wherein the diaphragm has a first side in fluid communication with the tire cavity and a second side in fluid communication with the interior chamber. The pump has a pump passageway has a first and second end, wherein the pump passageway is positioned in the tire to open and close as the tire rotates. The interior chamber has an inlet in fluid communication with the outside air, and an outlet in fluid communication with the first and second end of the pump passageway. The diaphragm is positioned over the outlet and operative to open and close said outlet. A spring is positioned in the interior chamber of the valve housing, and operative to bias the diaphragm in an open position, wherein said second end of the pump is in fluid communication with the tire cavity.

The invention provides is a second aspect a tire having a bidirectional pump and valve assembly. The tire has a tire cavity, and a first and second sidewall extending respectively from first and second tire bead regions to a tire tread region; the tire has a pump passageway, said pump passageway has a first end and a second end and being operative to allow a portion of the pump passageway near a tire footprint to close and open the pump passageway when the tire is rotated in a first direction or second direction opposite said first direction, the valve assembly has a valve housing and an interior chamber, wherein a diaphragm is mounted in the interior chamber, and wherein the diaphragm has a first side in fluid communication with the pressure of the tire cavity; said interior chamber having an inlet in fluid communication with the outside air, and an outlet in fluid communication with a first chamber and a second chamber; wherein said diaphragm is positioned over the outlet and operative to open and close the outlet; wherein a resilient member biases the diaphragm into the open position; wherein said first chamber has a one way valve positioned therein, and an outlet of said first chamber is in fluid communication with the pump passageway first end; wherein said second chamber has a one way valve positioned therein, and an outlet of the second chamber is in fluid communication with the pump passageway second end; wherein the valve housing further includes a third chamber, wherein the third chamber is in fluid communication with the pump first end and the tire cavity; wherein a one way valve is positioned in the third chamber, wherein the third chamber is located between the pump first end and the tire cavity.

DEFINITIONS

"Aspect ratio" of the tire means the ratio of its section height (SH) to its section width (SW) multiplied by 100 percent for expression as a percentage. "Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Passageway" means an integrally formed pathway in the tire or a discrete tube inserted in the tire forming the pump.

"Peristaltic" means operating by means of wave-like contractions that propel contained matter, such as air, along pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 13C is a cross sectional view of the inlet control valve in the direction 13c-13c of FIG. 13a;

FIG. 13E is a cross sectional view of the inlet control valve in the direction 13e-13e of FIG. 13a;

FIG. 13F is a cross sectional view of the inlet control valve in the direction 13f-13f of FIG. 13a;

DETAILED DESCRIPTION OF THE INVENTION

Figure 1:
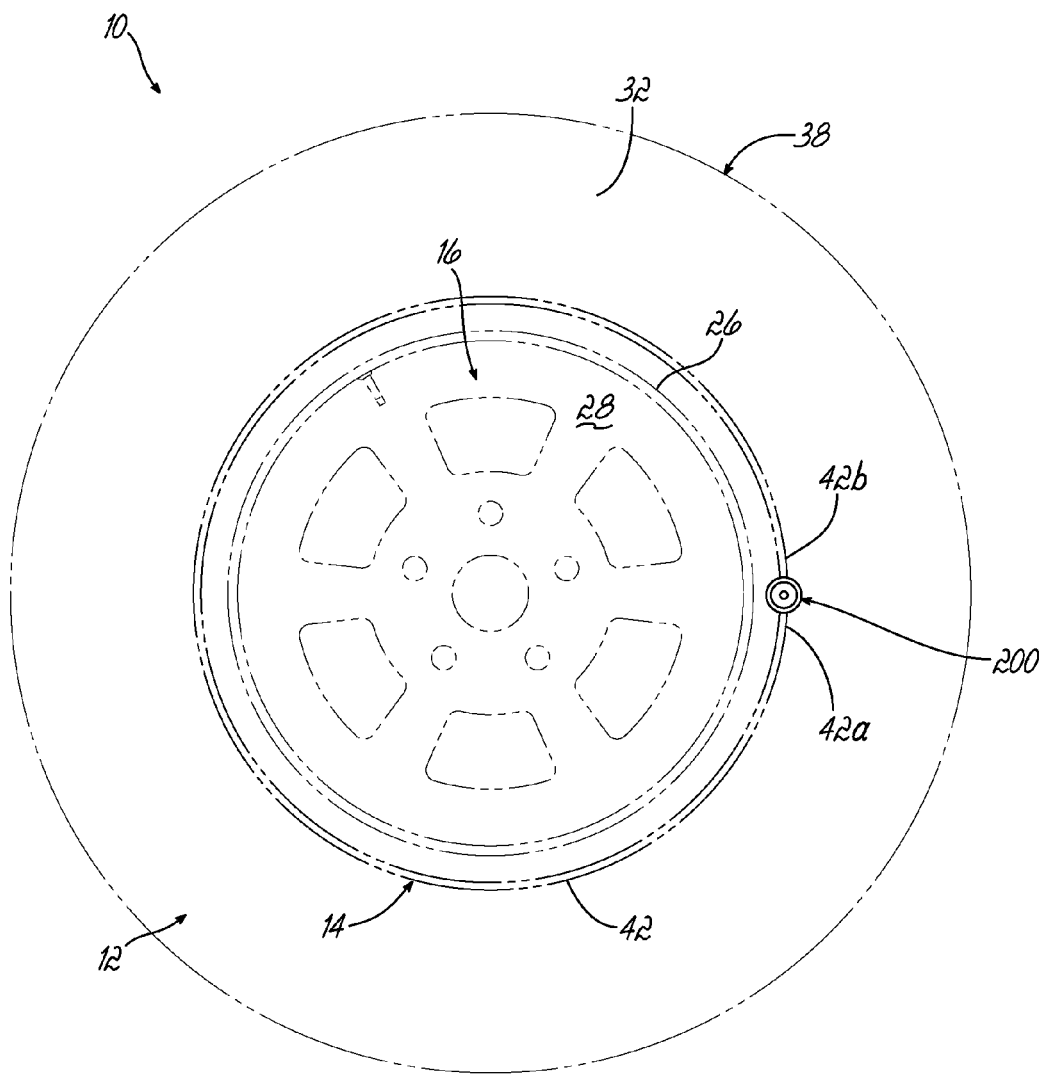
FIG. 1 is a front view of a tire and wheel assembly showing a pump and valve assembly.
Figure 3:
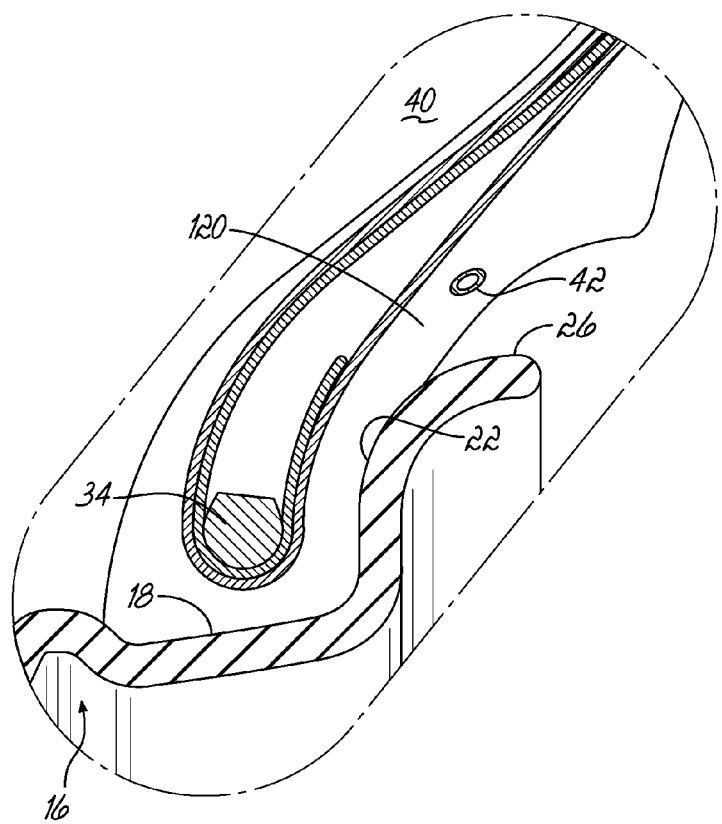
FIG. 3 is an enlarged cross-sectional view of the bead area of the tire, including the pump.
Figure 4:
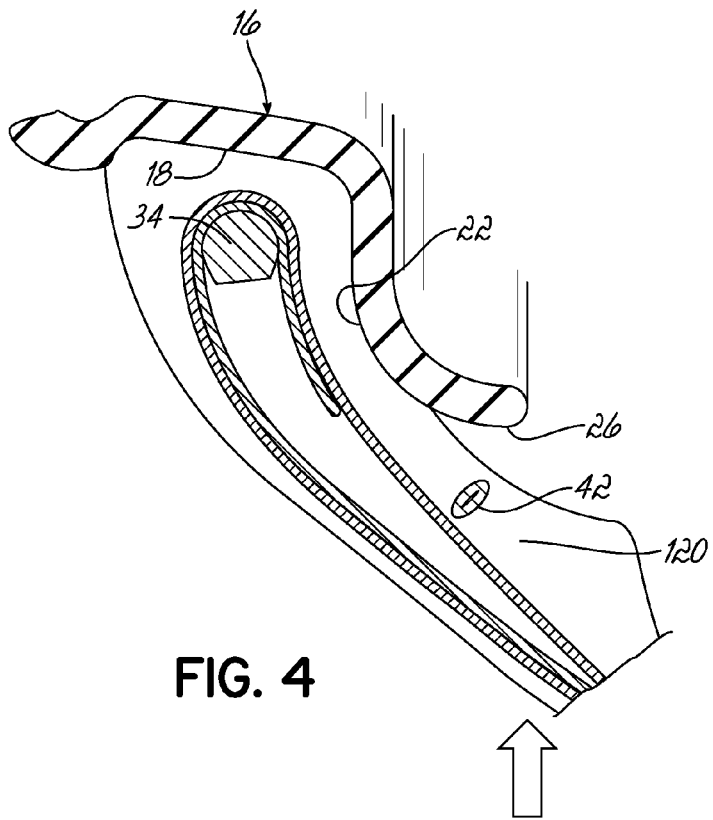
FIG. 4 is an enlarged cross-sectional view illustrating the pump being compressed in the tire bead area.

Referring to FIGS. 1 and 3, a tire assembly 10 includes a tire 12, a peristaltic pump assembly 14, and a wheel 16. The tire mounts in a conventional fashion to a rim of the wheel, the wheel having rim mounting surfaces 18 located adjacent outer rim flanges 22. The outer rim flange 22 has an outer rim surface 26. An annular wheel body 28 joins the rim flanges 22 and supports the tire assembly as shown. The tire is of conventional construction, having a pair of sidewalls 32 extending from opposite bead areas 34 to a crown or tire tread region 38. The tire and rim enclose an interior tire cavity 40.

As shown in FIG. 1 the pump assembly 14 includes a pump passageway 42 that is mounted or located in the sidewall area of the tire, preferably near the bead region. The pump passageway 42 may be formed of a discrete tube made of a resilient, flexible material such as plastic, elastomer or rubber compounds, and is capable of withstanding repeated deformation cycles when the tube is deformed into a flattened condition subject to external force and, upon removal of such force, returns to an original condition. The tube is of a diameter sufficient to operatively pass a volume of air sufficient for the purposes described herein and allowing a positioning of the tube in an operable location within the tire assembly as will be described. Preferably, the tube has an elliptical cross-sectional shape, although other shapes such as round may be utilized.

The pump passageway itself may also be integrally formed into the sidewall of the tire during vulcanization, eliminating the need for an inserted tube. An integrally formed pump passageway is preferably made by building into a selected green tire component such as a chafer, a removable strip made of wire or silicone. The component is built into the tire and cured. The removable strip is then removed post cure to form a molded in or integrally formed pump air passageway.

Hereinafter, the term "pump passageway" refers either to installed tubes or an integrally molded in passageway. The location selected for the air passageway within the tire may be within a tire component residing within a high flex region of the tire, sufficient to progressively collapse the internal hollow air passageway as the tire rotates under load thereby conveying air along the air passageway from the inlet to the pump outlet.

The pump air passageway 42 has an inlet end 42a and an outlet end 42b joined together by a compact valve system 200. As shown, the inlet end 42a and the outlet end 42b are spaced apart approximately 360 degrees forming an annular pump assembly.

Compact Valve System 200

Figure 10A:
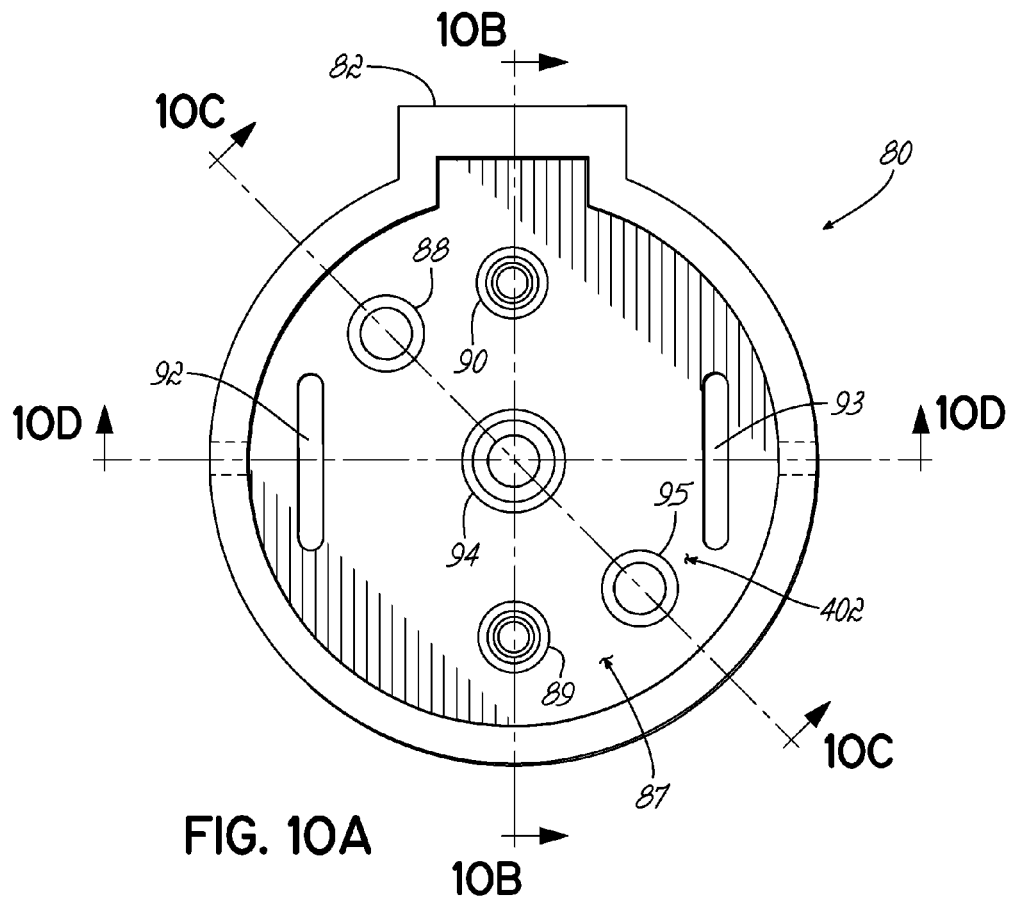
FIG. 10A is a top view of the retainer.
Figure 10B:
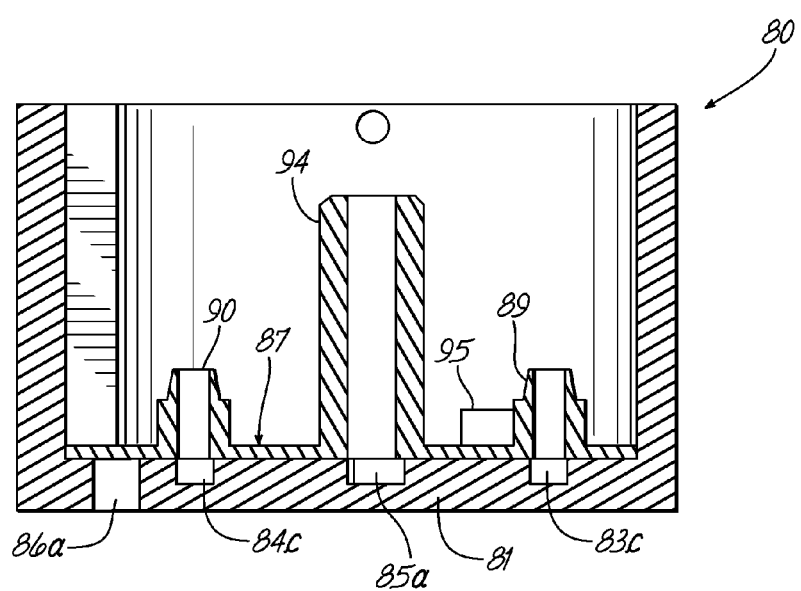
FIG. 10B is a cross-sectional view of the retainer in the direction 10B-10B of FIG. 10A.
Figure 10C:
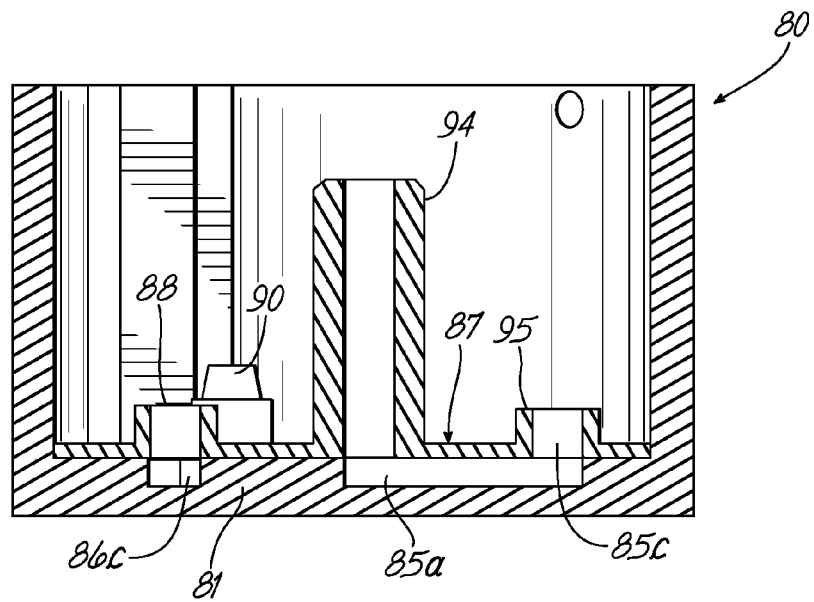
FIG. 10C is a cross-sectional view of the retainer in the direction 10C-10C of FIG. 10A.
Figure 10D:
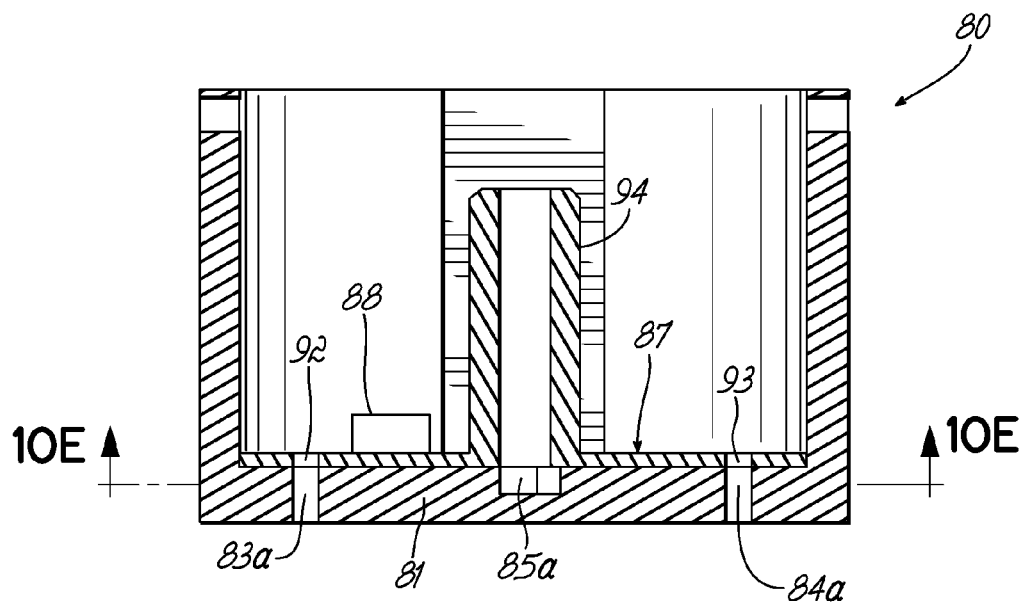
FIG. 10D is a cross-sectional view of the retainer in the direction 10D-10D of FIG. 10A.
Figure 10E:
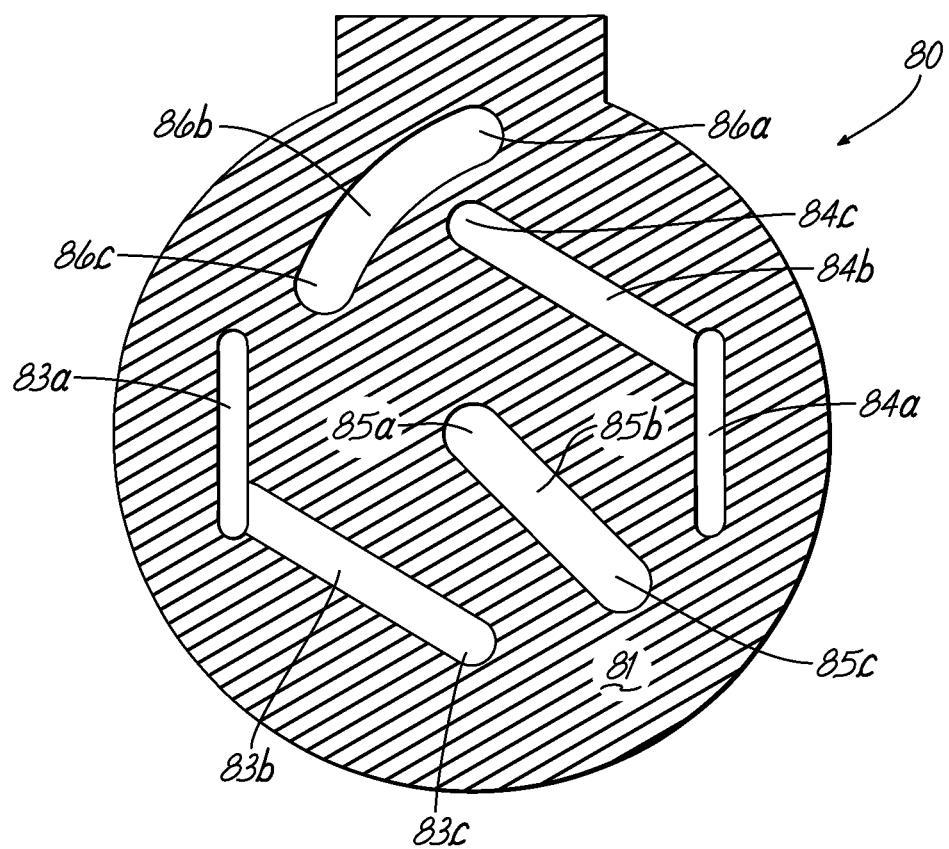
FIG. 10E is a cross-sectional view of the retainer in the direction 10E-10E of FIG. 10D.
Figure 11:
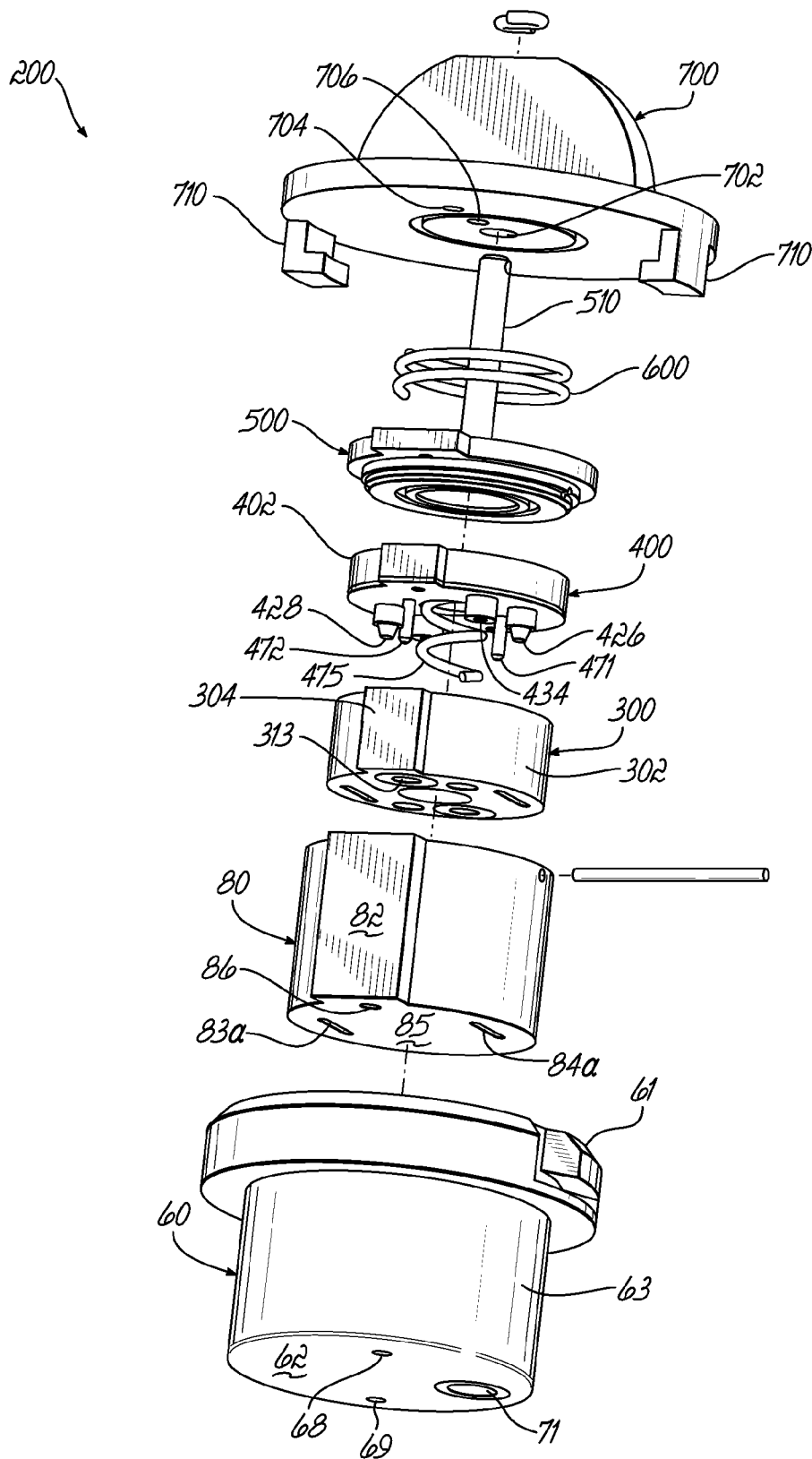
FIG. 11 is an exploded view of the compact valve system and filter assembly.

A first embodiment of a compact valve system 200 is shown in FIGS. 5-14. FIG. 11 illustrates an exploded view of the compact valve system 200. The compact valve system includes an inlet control valve 400 which functions to regulate and control the inlet flow and exit flow of the pump 42. Starting from the bottom of the Figure, the compact valve system 200 includes an optional insert 60, a retainer 80, a flow controller 300, an inlet control valve 400 and cap 500, a spring 600, and a lid 700. An optional filter assembly 800 is connected to the compact valve system 200.

Insert 60

Figure 5A:
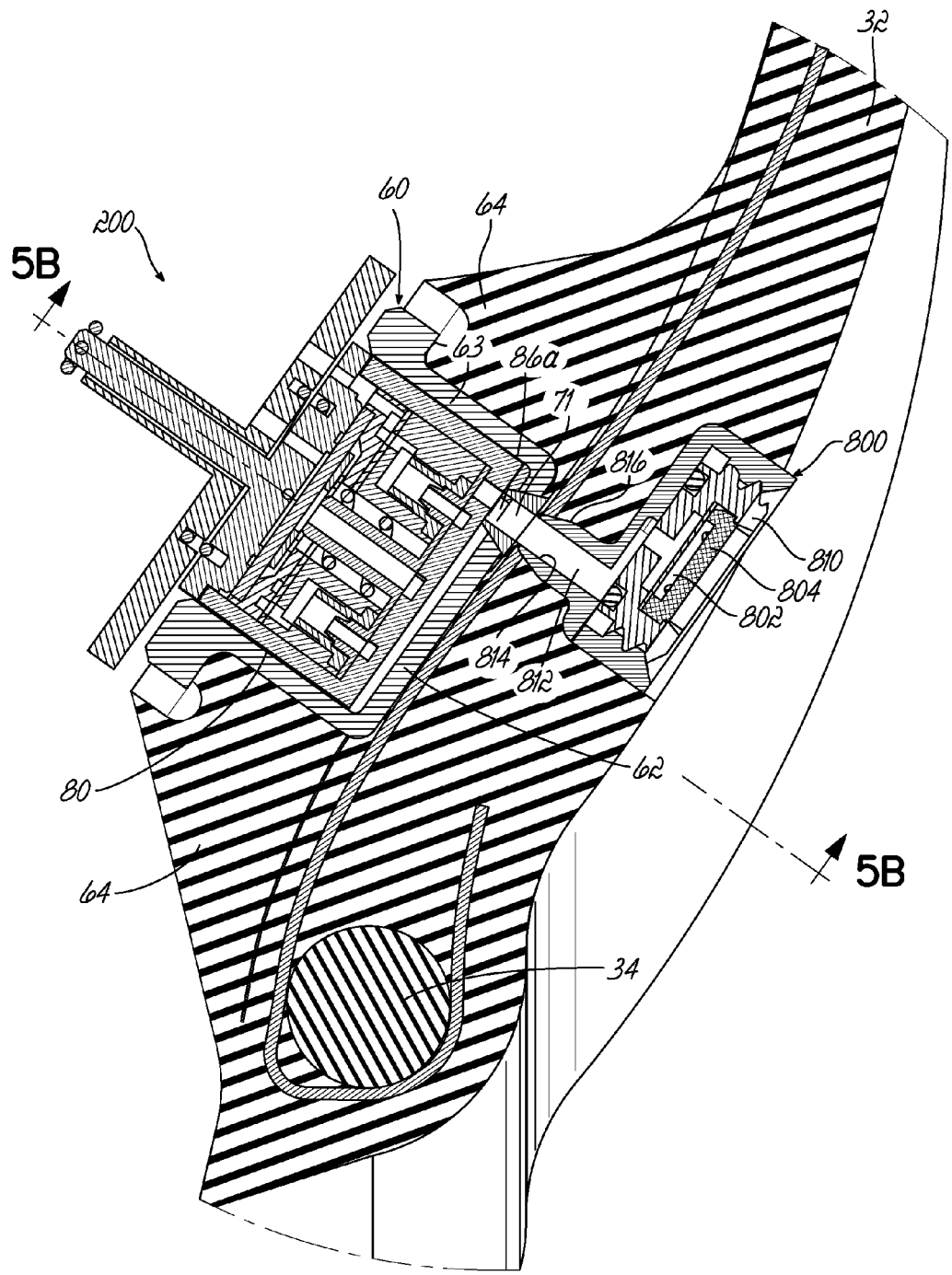
FIG. 5A is a cross sectional view of the bead area shown with the compact valve system and filter assembly of the present invention.

As shown in FIG. 5A, the compact valve system includes an optional insert 60 that is inserted into a receptacle 64 built in the tire. The receptacle 64 is a raised area or hump formed on the tire inner surface and may optionally include a threaded inner hole, wherein the hump may be built into the tire sidewall using a series of concentric layers of material, such as uncured elastomer, green rubber. A one piece molded shape of rubber or elastomer may also be used instead of the concentric layers. Alternatively, the insert 60 may be inserted into the receptacle prior to vulcanization. The outer insert may be made of green rubber, elastomer, nylon, ultra high molecular weight polyethylene or metal such as brass. The insert is preferably coated with a suitable adhesive such as resorcinol formaldehyde latex (RFL) or commonly referred to as "dip" known to those skilled in the art. The outer surface of the insert may be roughened and coated with the selected RFL. The outer surface of the insert may further include ridges, flanges, extensions, threads or other mechanical means in addition to the selected RFL to retain the insert into the rubber of the tire sidewall.

Figure 5B:
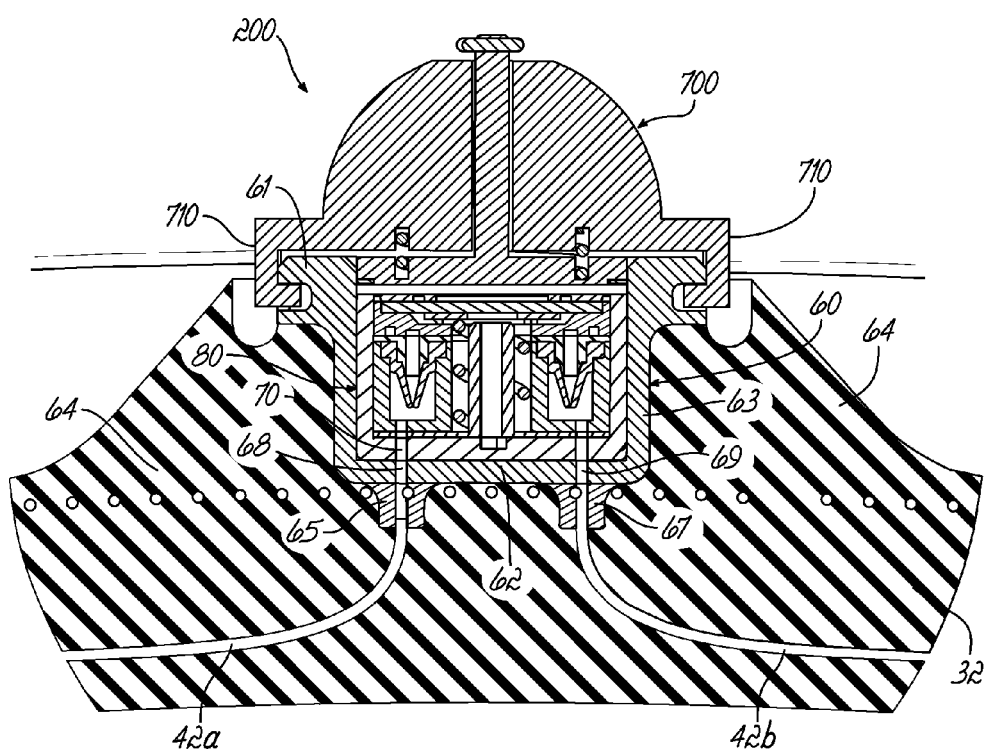
FIG. 5B is an enlarged view of the compact valve system of FIG. 5A in the direction 5B-5B.

As shown in FIG. 5B, the optional insert 60 is shaped like a cup and has an interior section formed by an open end facing the tire cavity, a bottom wall 62 opposite the open end and a sidewall 63. The bottom wall has two male portions 65 and 67 extending from the bottom wall that align and connect to the pump passageways 42a, 42b for communicating fluid between the insert 60 and pump 42. Each male portion has a hole therethrough for communicating filtered air to the interior of the valve. The bottom portion also has two opposed holes 68, 69 for alignment and fluid communication with the pump passageways 42a, 42b. An optional gasket 70 is positioned on the bottom wall 62 of the insert 60. The gasket is circular and flat, with holes aligned with the holes 68, 69 of the insert 60. The gasket may also have protruding rims around the three holes. As shown in FIG. 5A, the bottom wall 62 of the insert 60 has a third hole 71 for receiving the male fitting 816 of the filter assembly 800. The outer insert 60 also has a flanged rim portion 61 that surrounds the sidewall 63 with opposed female slots. A lid 700 with two opposed U shaped connectors 710 are received within opposed female slots.

Retainer 80

The optional outer insert 60 houses a retainer 80. The retainer 80 is shown in FIGS. 8-9 and FIGS. 10A-E. The retainer 80 is generally cylindrically shaped, with an alignment key 82 projecting from the outer surface. The alignment key 82 is seated in mating engagement with an alignment slot (not shown) formed in the sidewall of the outer insert 60. The alignment key 82 ensure that slots 83a, 84a on the bottom surface of the retainer aligns with holes 68, 69 of the insert. The bottom surface 85 of the retainer further includes a hole 86 for receiving filtered air from the filter assembly 800. The insert 60 is an optional component that may be eliminated, and the outer surface of the retainer 80 may be threaded for reception into the receptacle 64.

Figure 9:
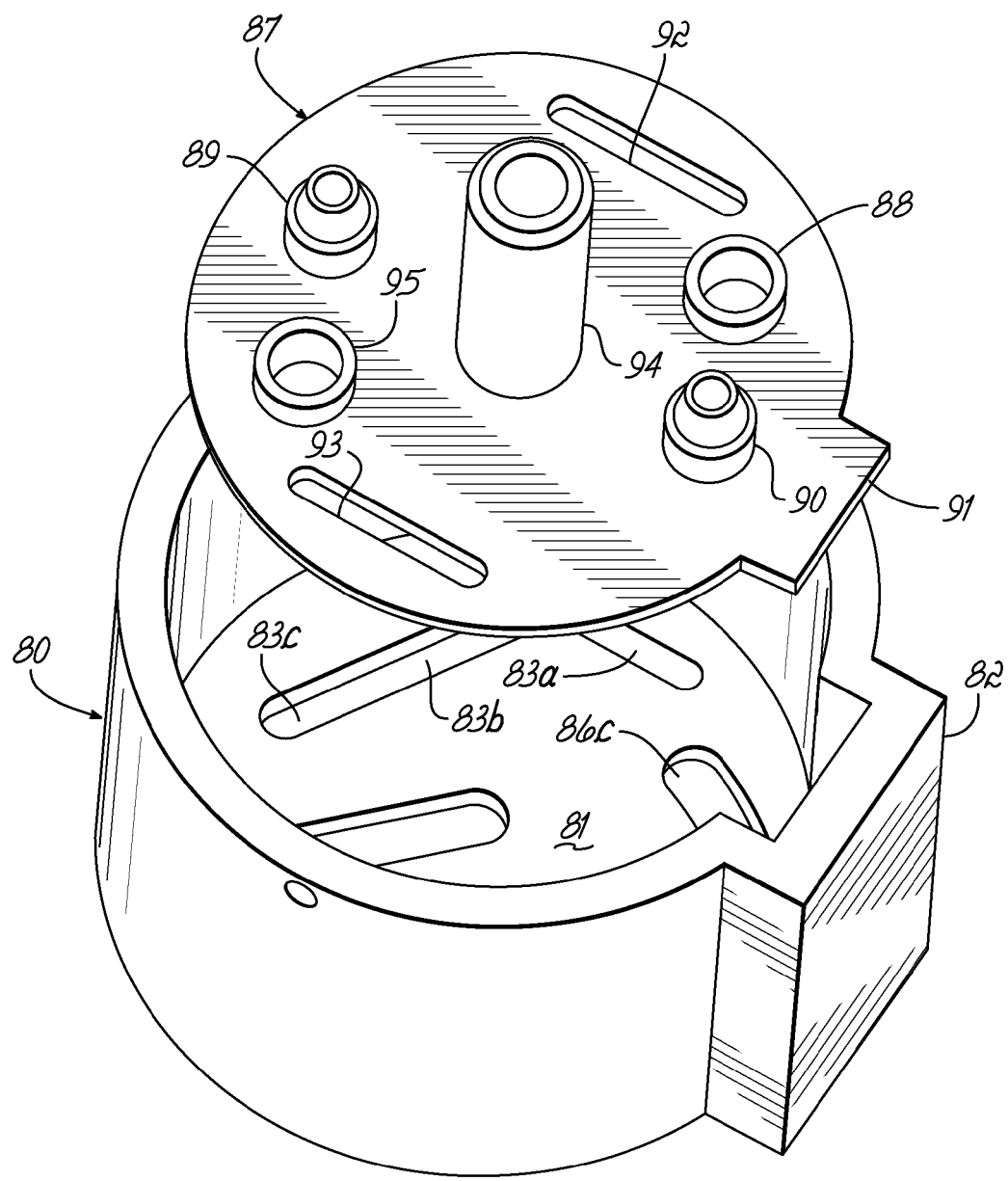
FIG. 9 is an exploded view of the retainer and the upper plate.

FIG. 9 illustrated an exploded view of the retainer 80 wherein an upper plate 87 is positioned over the bottom surface 81, so that an alignment tab 91 is received in the alignment key 82 of the retainer 80. FIG. 10E illustrates a cross-sectional view of the bottom of the retainer 80. As shown in FIG. 10E, the bottom surface 81 of the retainer has grooves formed therein, which cooperate with the upper plate to form passageways 83b, 84b, 85b and 86b. Fluid from the pump enters one of slotted holes 83a, 84a depending upon the direction of the tire rotation. Flow from slotted holes 83a, 84a is then communicated through angled passageways 83b, 84b to locations 83c, 84c, respectively. As shown in FIG. 10B, flow from location 83c, 84c is then directed through respective port 89,90 of upper plate 87. As shown in FIG. 10D, the upper plate 87 has opposed slots 92, 93 positioned for alignment with slots 83a, 84a. As shown in FIG. 10B, inlet flow from the filter enters the retainer through hole 86a, which is then routed through angled channel 86b into location 86c as shown in FIG. 10E. As shown in FIG. 10C, flow from location 86c is then ported through hole 88 of the upper plate 87.

FIG. 10D illustrates a central port 94 mounted on upper plate 87. The central port 94 is in alignment with location 85a and fluid communication with passageway 85b. The central port 94 is in fluid communication with flow from the inlet control valve 400, and communicates flow from the inlet control valve 400, through central port 94, through passageway 85b to location 85c, through port 95 and into the flow controller 300 as shown in FIG. 10C, and as described in more detail, below.

Flow Controller 300

Figure 12A:
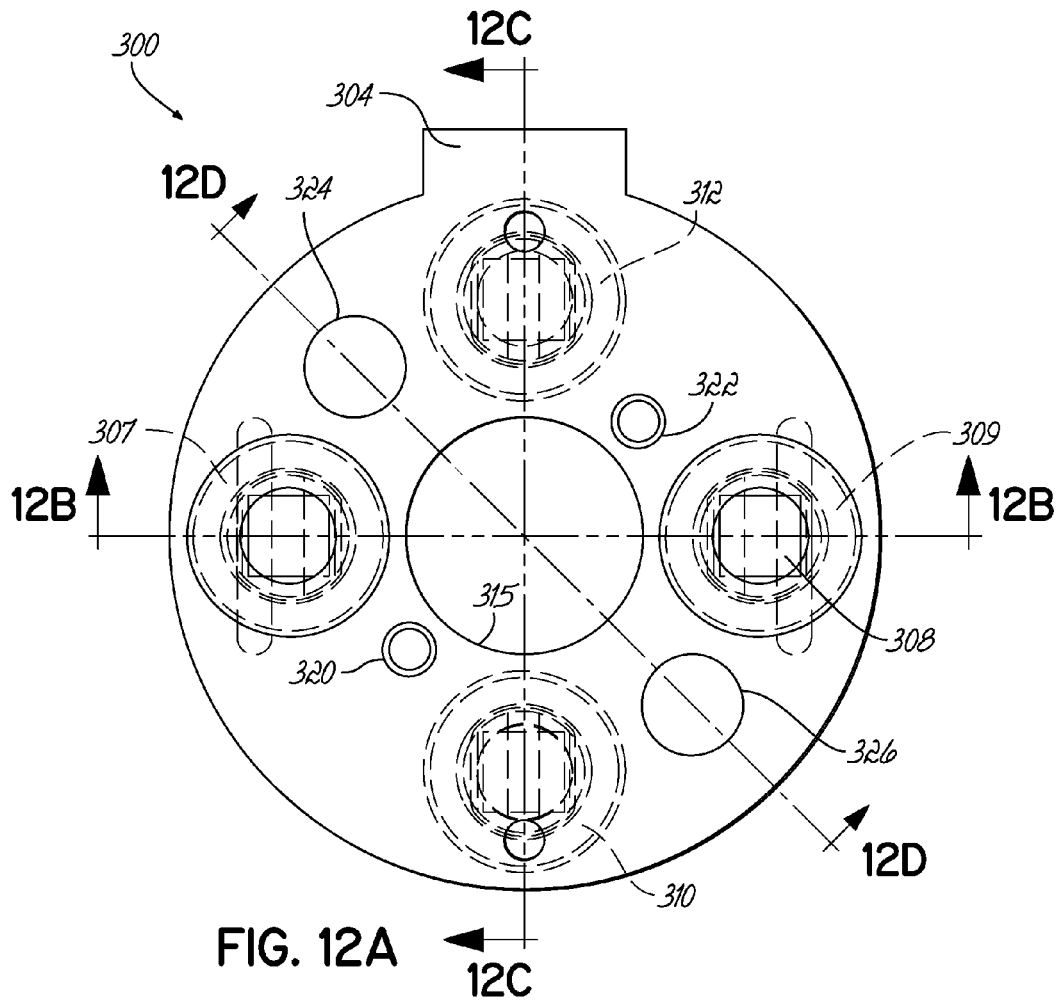
FIG. 12a is a top view of the flow controller.
Figure 12B:
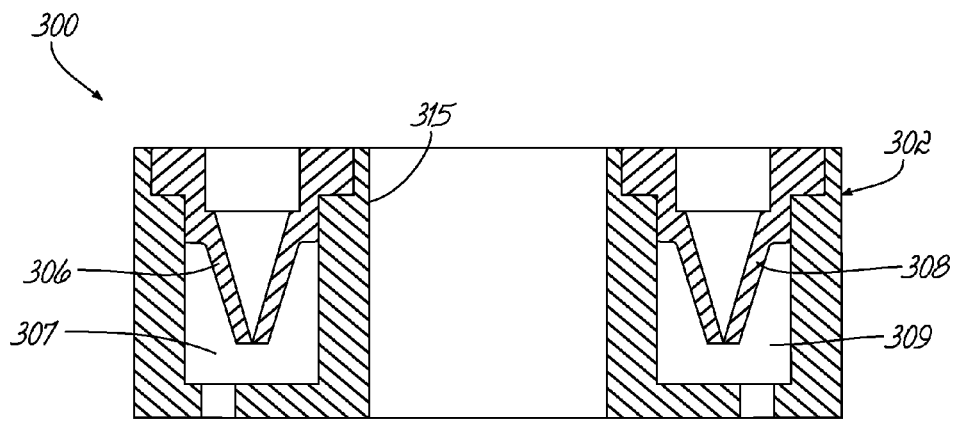
FIG. 12b is a cross-sectional view of the flow controller in the direction 12b-12b.
Figure 12C:
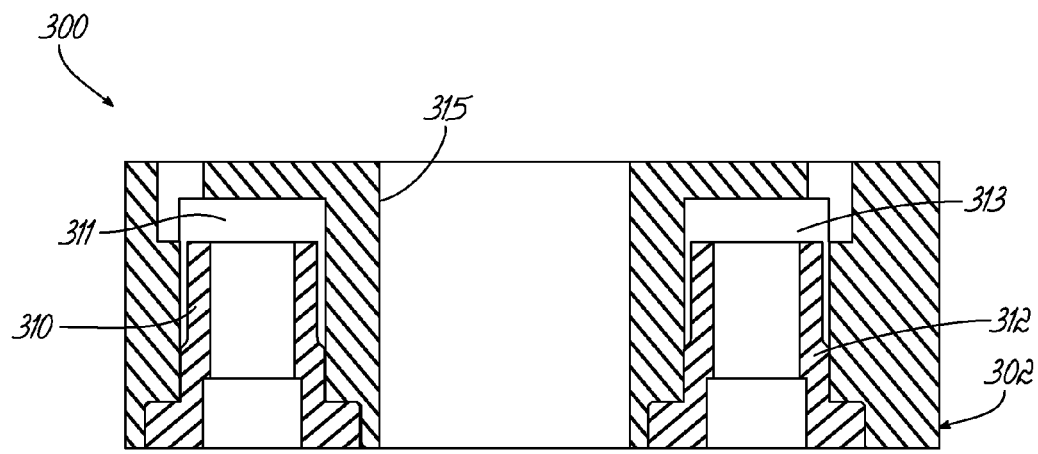
FIG. 12c is a cross-sectional view of the flow controller in the direction 12c-12c.
Figure 12D:
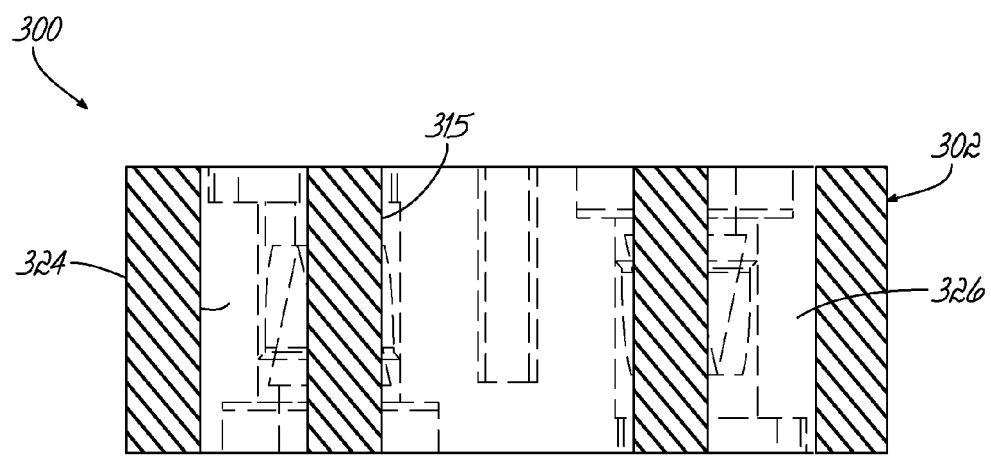
FIG. 12d is a cross-sectional view of the flow controller in the direction 12d-12d.
Figure 14A:
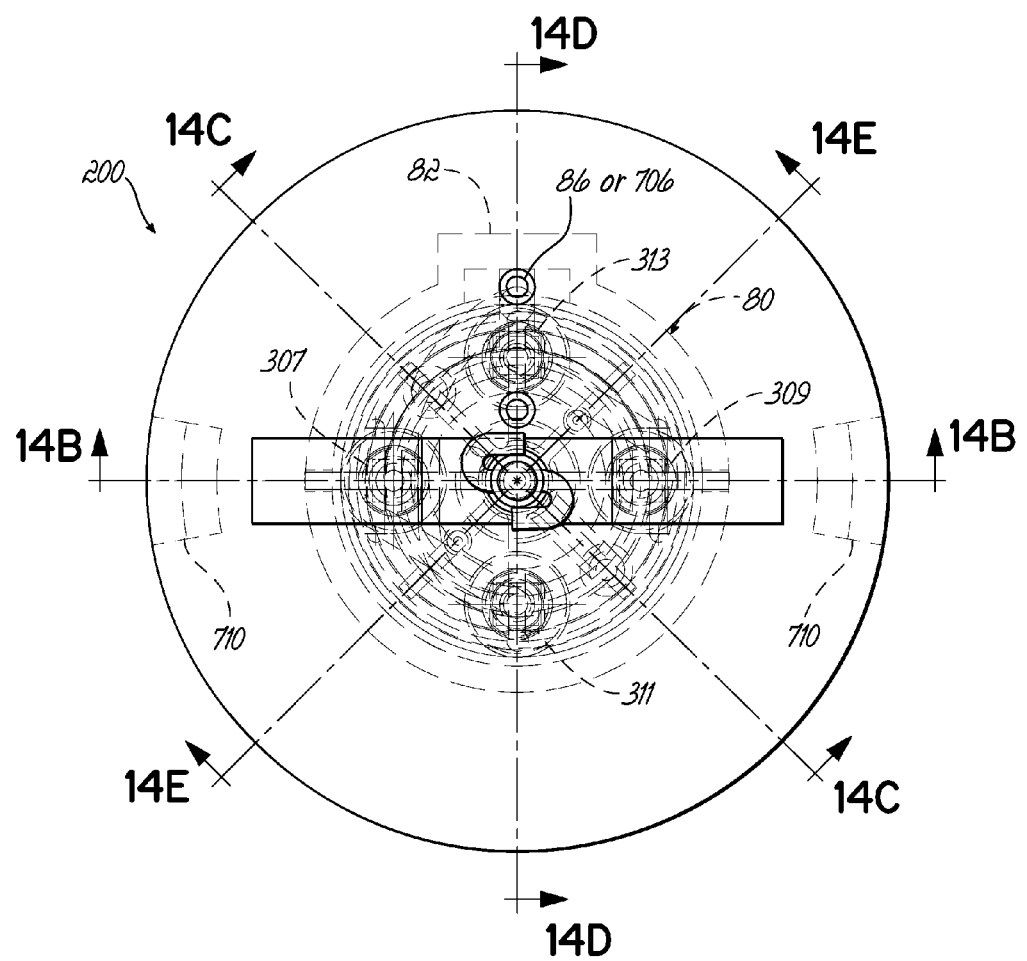
FIG. 14A is a top view of the compact valve system, shown without the insert.
Figure 14B:
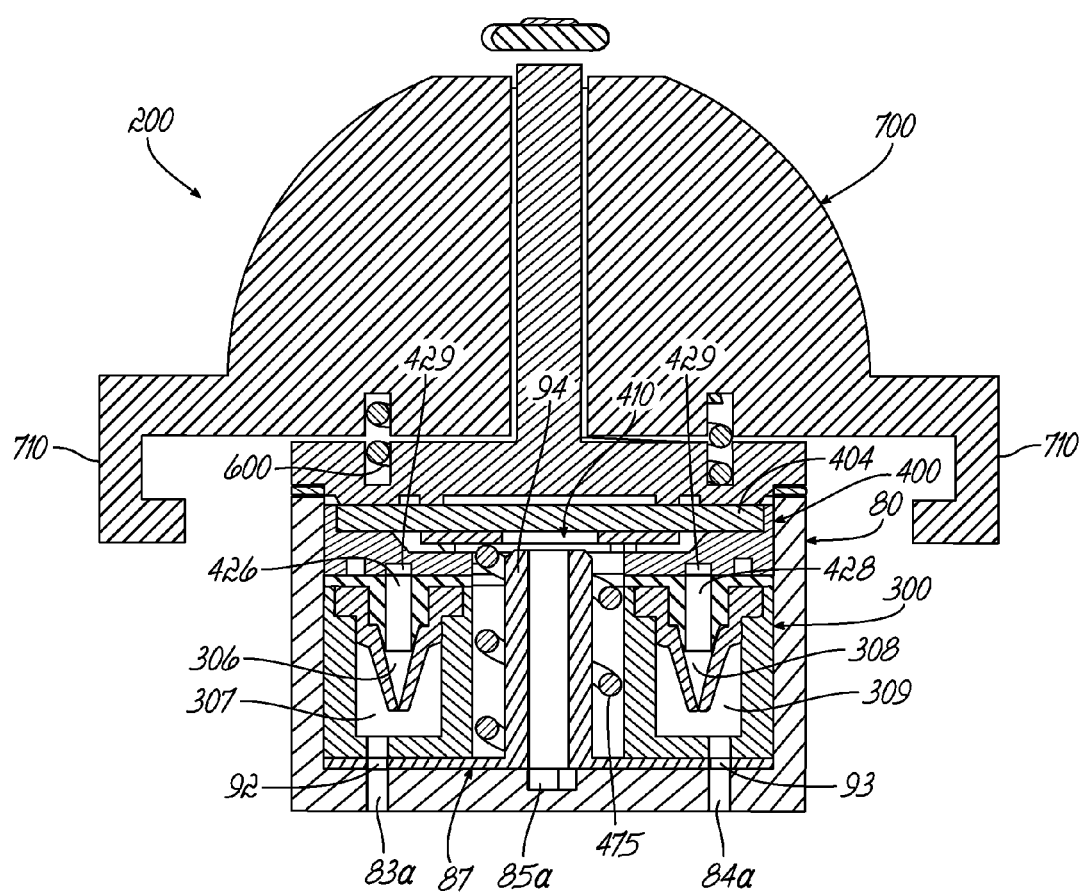
FIG. 14B is a cross-sectional view of the compact valve system of FIG. 14A in the direction 14b-14b.
Figure 14C:
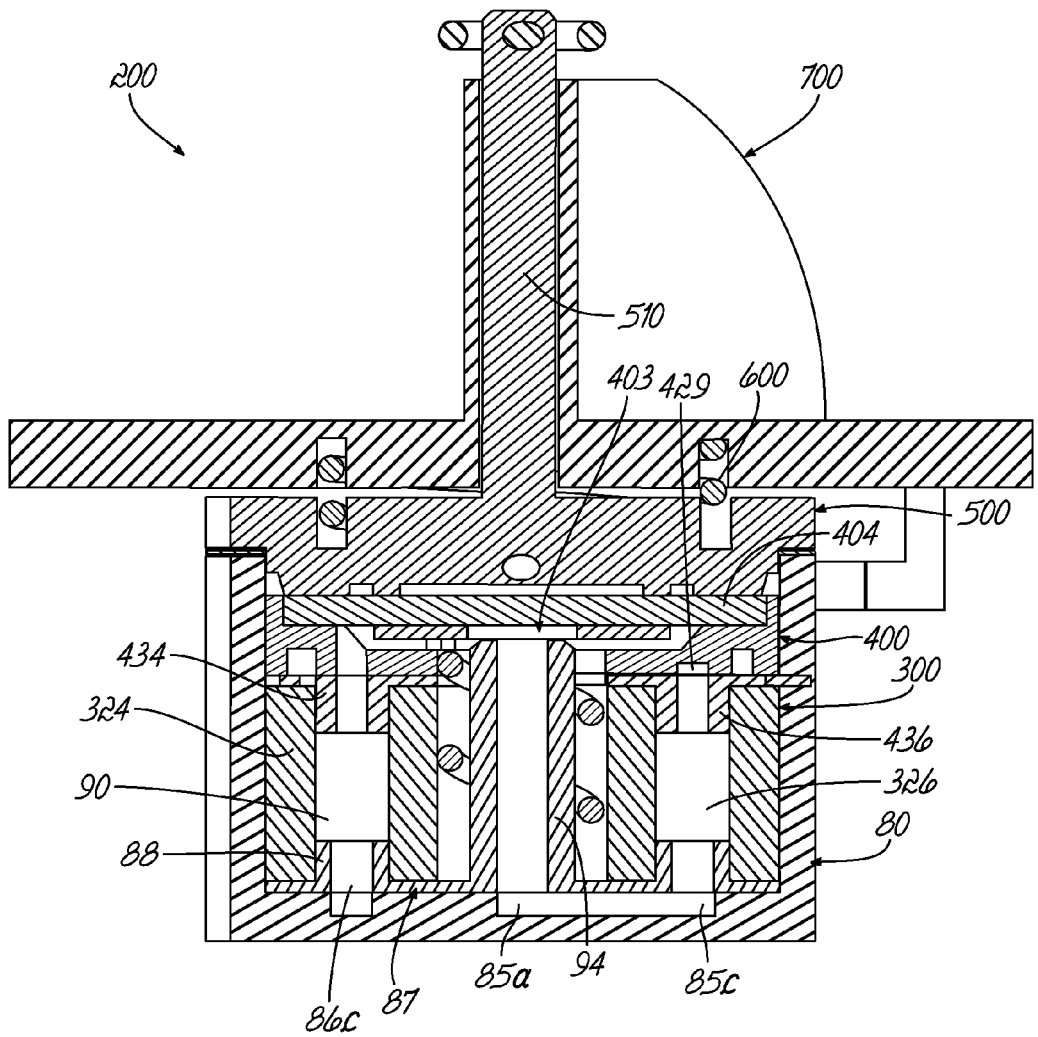
FIG. 14C is a cross-sectional view of the compact valve system of FIG. 14A in the direction 14c-14c.
Figure 14D:
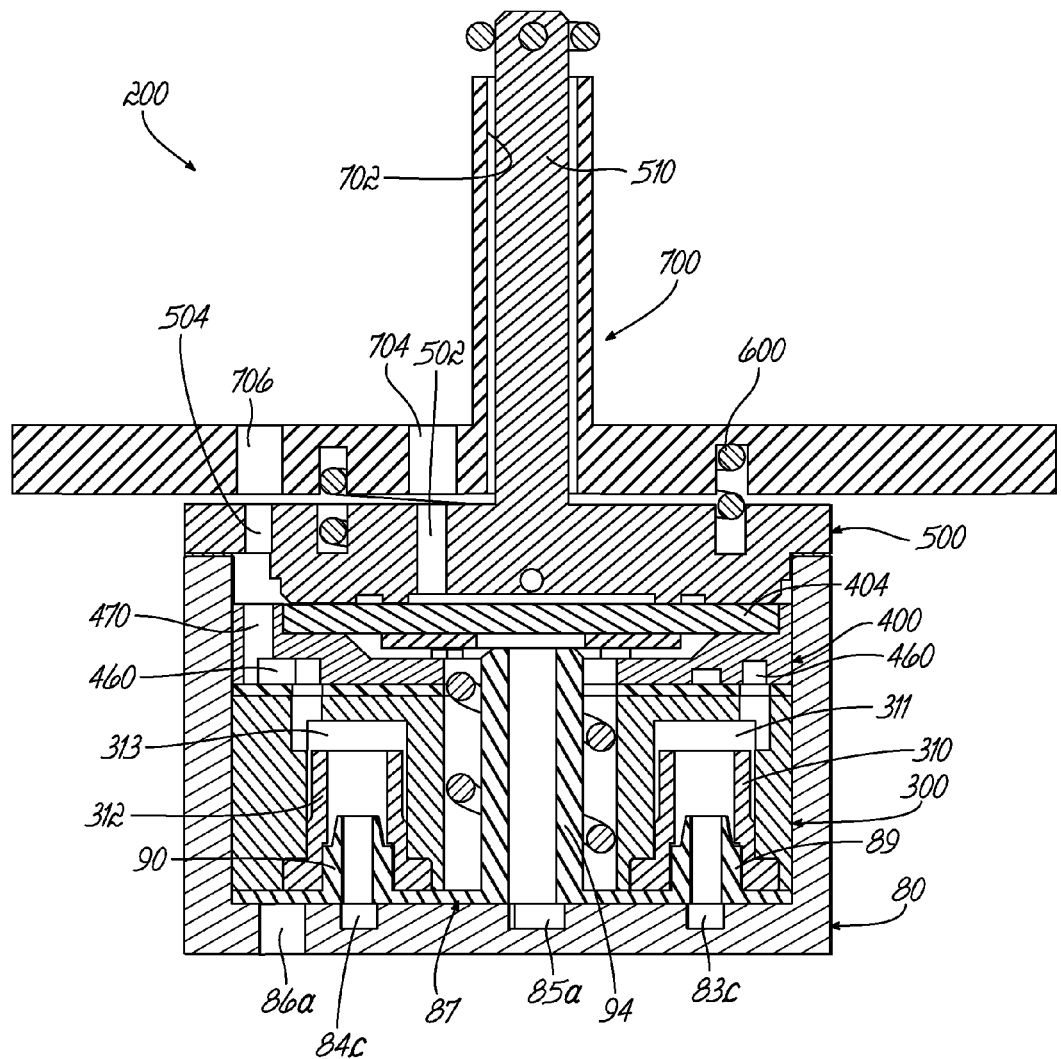
FIG. 14D is a cross-sectional view of the compact valve system of FIG. 14A in the direction 14d-14d.
Figure 14E:
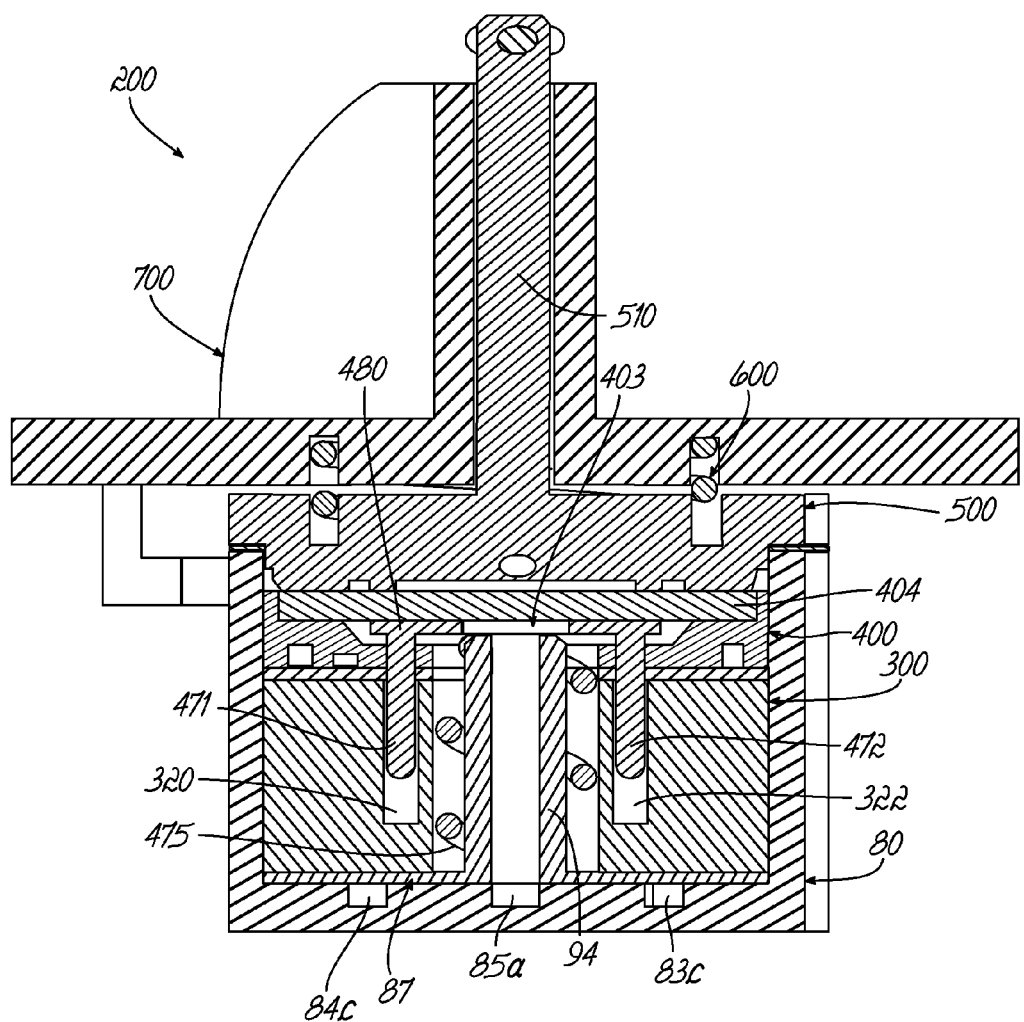
FIG. 14E is a cross-sectional view of the compact valve system of FIG. 14A in the direction 14e-14e.

As shown in FIG. 11, a flow controller 300 is positioned inside the retainer 80 over the upper plate 87. The flow control body 302 has an alignment tab 304 positioned for reception in the alignment key 82 of the retainer. As shown in FIG. 12B, the flow controller 300 has directional control valves 306, 308 that are received in respective chambers 307, 309. The directional control valves 306, 308 are in fluid communication with inlet air flow from the inlet control valve. As shown in FIG. 14B, chambers 307,309 are in fluid communication with the pump passageways 42a, 42b. The flow controller further includes anti return valves 310, 312 received in chambers 311, 313. As shown in FIG. 14D, chambers 311, 313 are in fluid communication with the anti return valve outlet 310, 312 and the tire cavity, as explained in more detail, below.

Inlet Control Valve

Figure 13A:
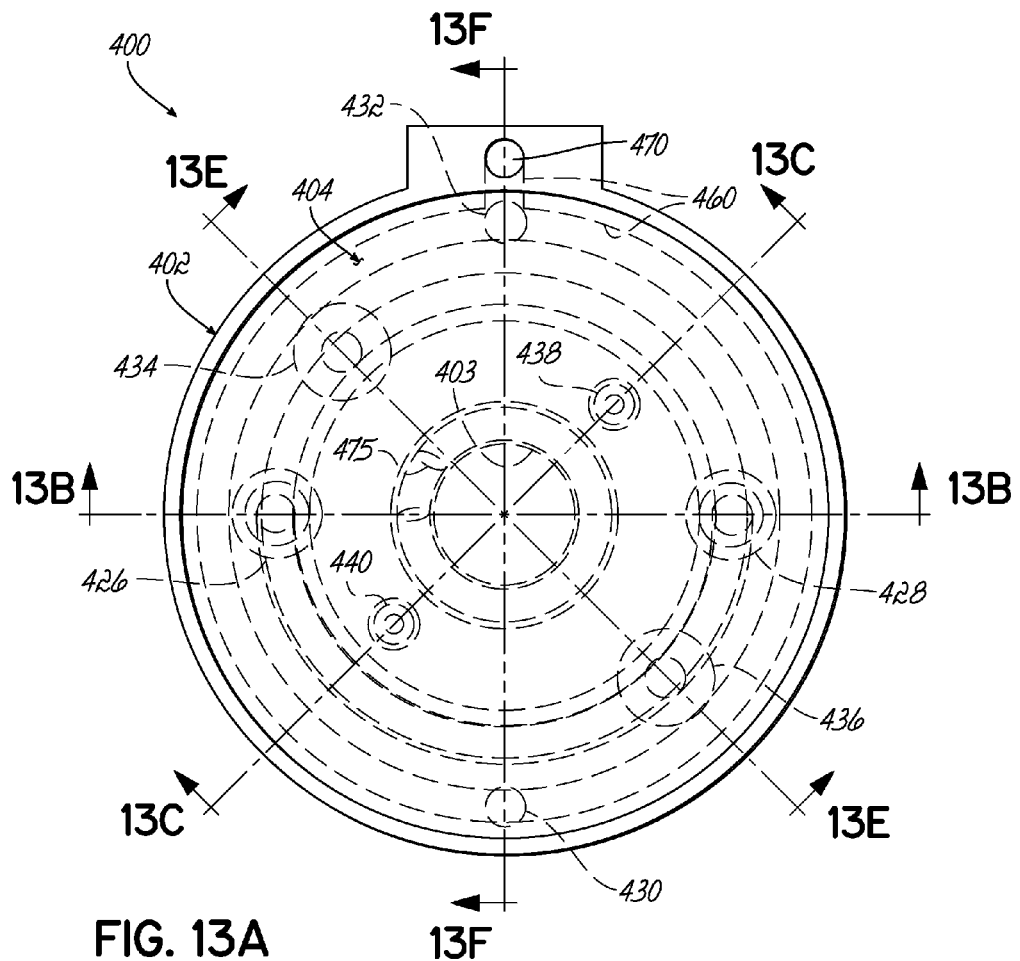
FIG. 13A is a top view of the inlet control valve.
Figure 13B:
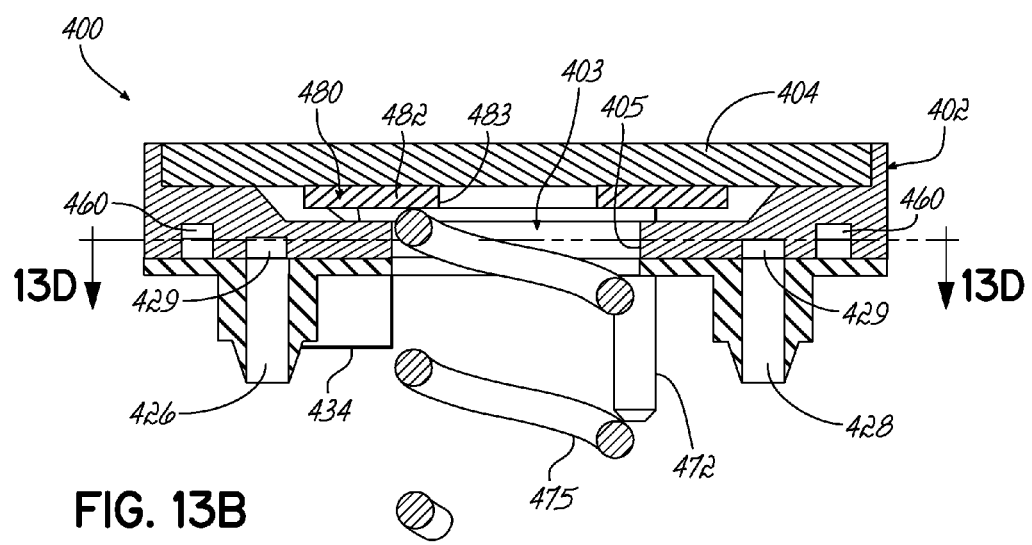
FIG. 13B is a cross-sectional view of the inlet control valve in the direction 13b-13b of FIG. 13A.
Figure 13C:
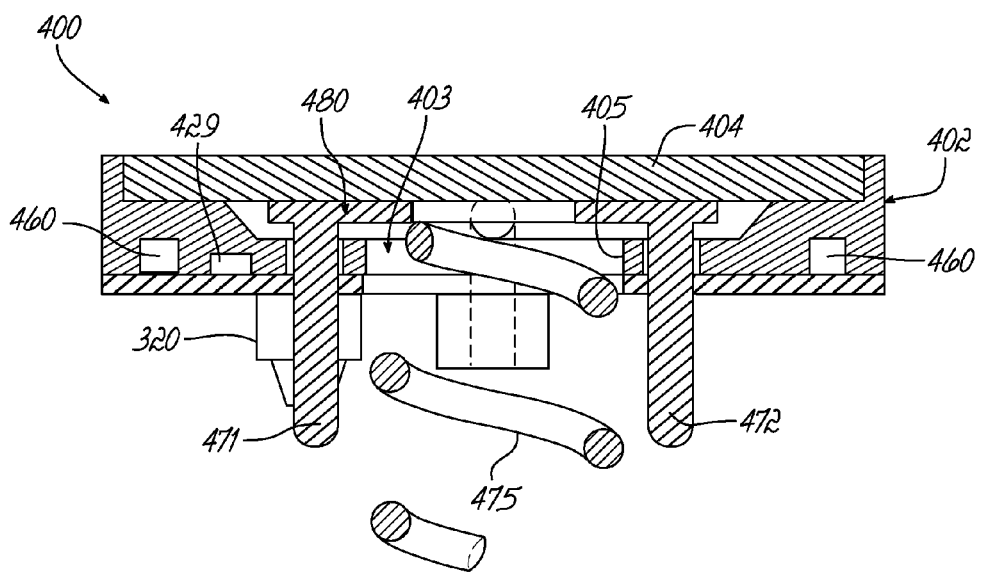
Figure 13D:
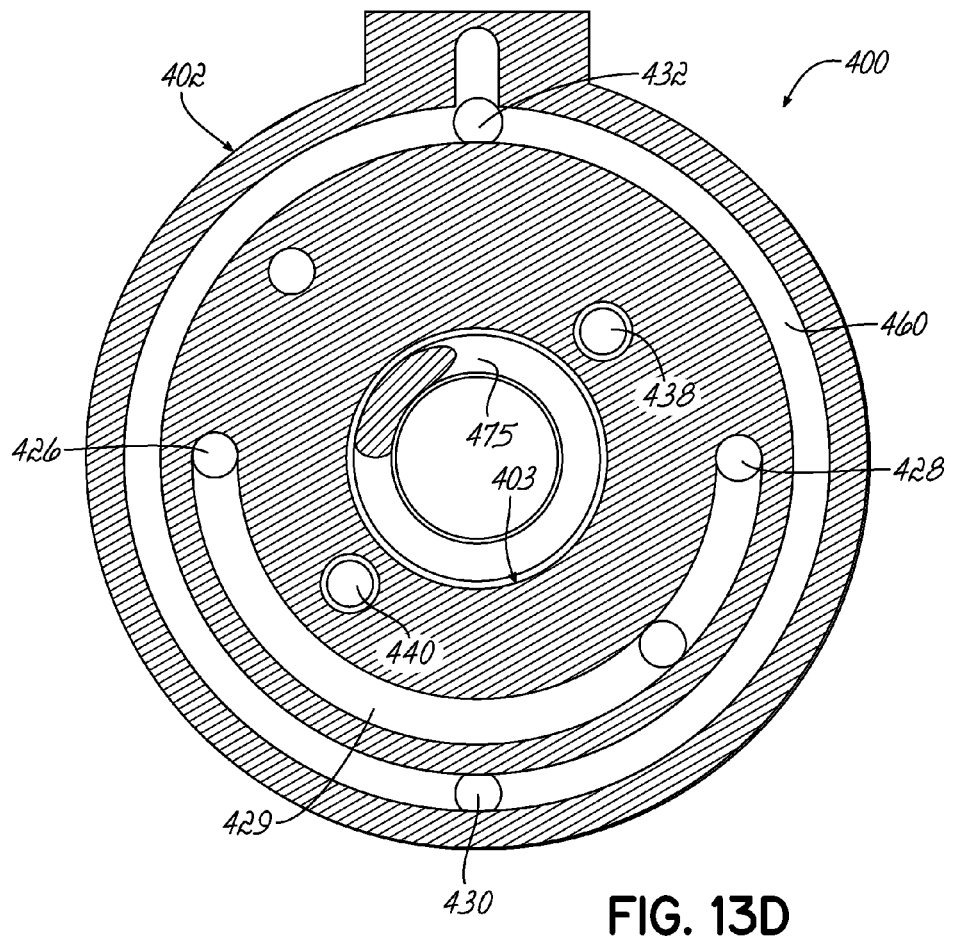
FIG. 13D is a cross sectional view of the inlet control valve in the direction 13d-13d of FIG. 13b.
Figure 13E:
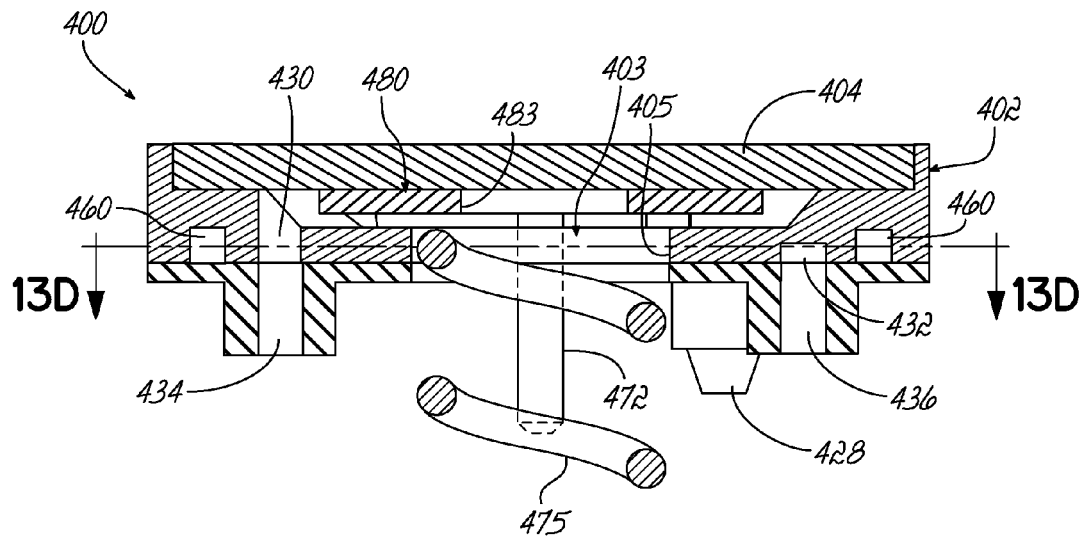
Figure 13F:
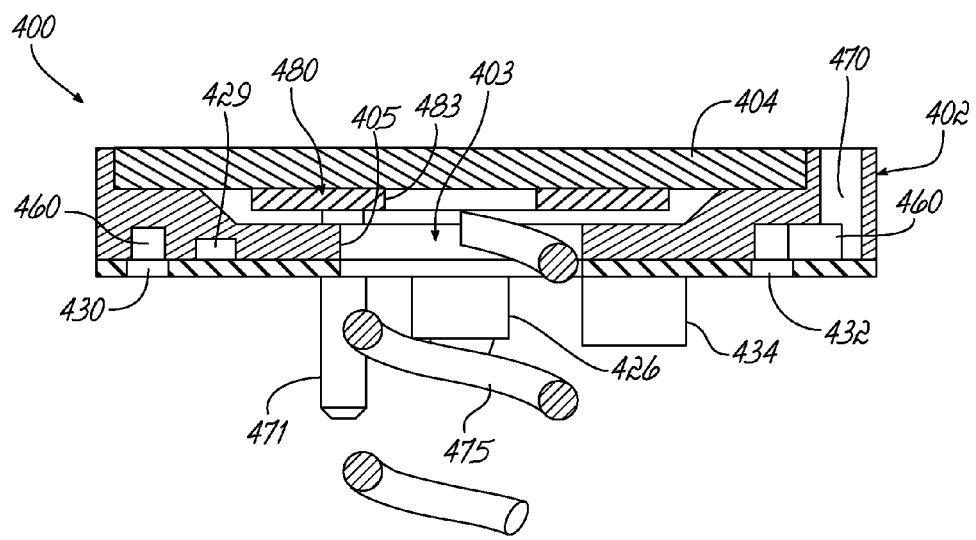

As shown in FIGS. 13a-13e, an inlet control valve 400 is positioned inside the retainer 80 and adjacent to the flow controller 300. The inlet control valve 400 regulates the intake flow to the pump system. As shown in FIG. 13b, the inlet control valve has a housing 402 for housing a circular shaped diaphragm 404. The housing 402 has first and second passageways 426,428, which are joined together by a curved slot 429. The curved slot 429 is formed in the bottom of the housing 402, as shown in FIG. 13d. Each first and second passageway 426,428 aligns with the directional control valves 306,308 positioned in chamber 307,309 respectively of the flow controller 300 as shown in FIG. 14B. As shown in FIG. 13F, the inlet control housing 402 also has two aligned holes on the bottom surface in a second direction, perpendicular to the first direction: third passageway 430 and fourth passageway 432. As shown in FIG. 13D, third passageway 430 and fourth passageway 432 are in fluid communication by annular slot 460 formed in the inlet housing 402. As shown in FIG. 13F, the annular slot 460 is in fluid communication with outlet channel 470, that ports to the tire cavity to fill the tire with pumped air. The annular slot is in fluid communication with passageways 430, 432 from the pump outlet.

The inlet control valve further includes a diaphragm 404 that is positioned in the interior of the housing 402 as shown in FIG. 13B. The diaphragm together with the inlet housing forms an interior chamber 403. The interior of chamber includes a central hole 405, and the diaphragm is positioned over the central hole 405. A control plate 480 has an upper annular surface 482 that is positioned adjacent the interior surface of the diaphragm. The upper annular surface 482 of the control plate 480 has a central hole 483 that is aligned with central hole 403. As shown in FIG. 13C, the control plate has two legs 470, 472 which are received in respective holes 440, 438 of the bottom surface of the inlet control housing. The legs 470,472 are slidable within channels 320, 322 of the flow controller. A spring 475 is positioned in central holes 405, 483. The spring 475 is positioned about the central port 94. As shown in FIG. 13B, the spring engages the upper annular surface 482 of the control plate, which engages the diaphragm 404, and biases the control plate and diaphragm in the open position, so that the diaphragm does not close the central port 94. As shown in FIG. 14D, an inner cap 500 is positioned over the inlet control valve and is secured to the retainer 80. The inner cap has an interior hole 502 to allow fluid communication of the diaphragm with the inside cavity of the tire. The cap has a second hole 504 that is in fluid communication with the passageway 470. A lid 700 is received over the inner cap 500. A spring 600 is positioned between the lid 700 and the inner cap 500. The inner cap 500 has a central support column 510 which is received in a central hole 702 of outer cap. The outer cap has aligned holes 704, 706 with holes 502, 504. A lid 700 with two opposed U shaped connectors 710 are received within opposed female slots of the outer insert 60.

Figure 7:
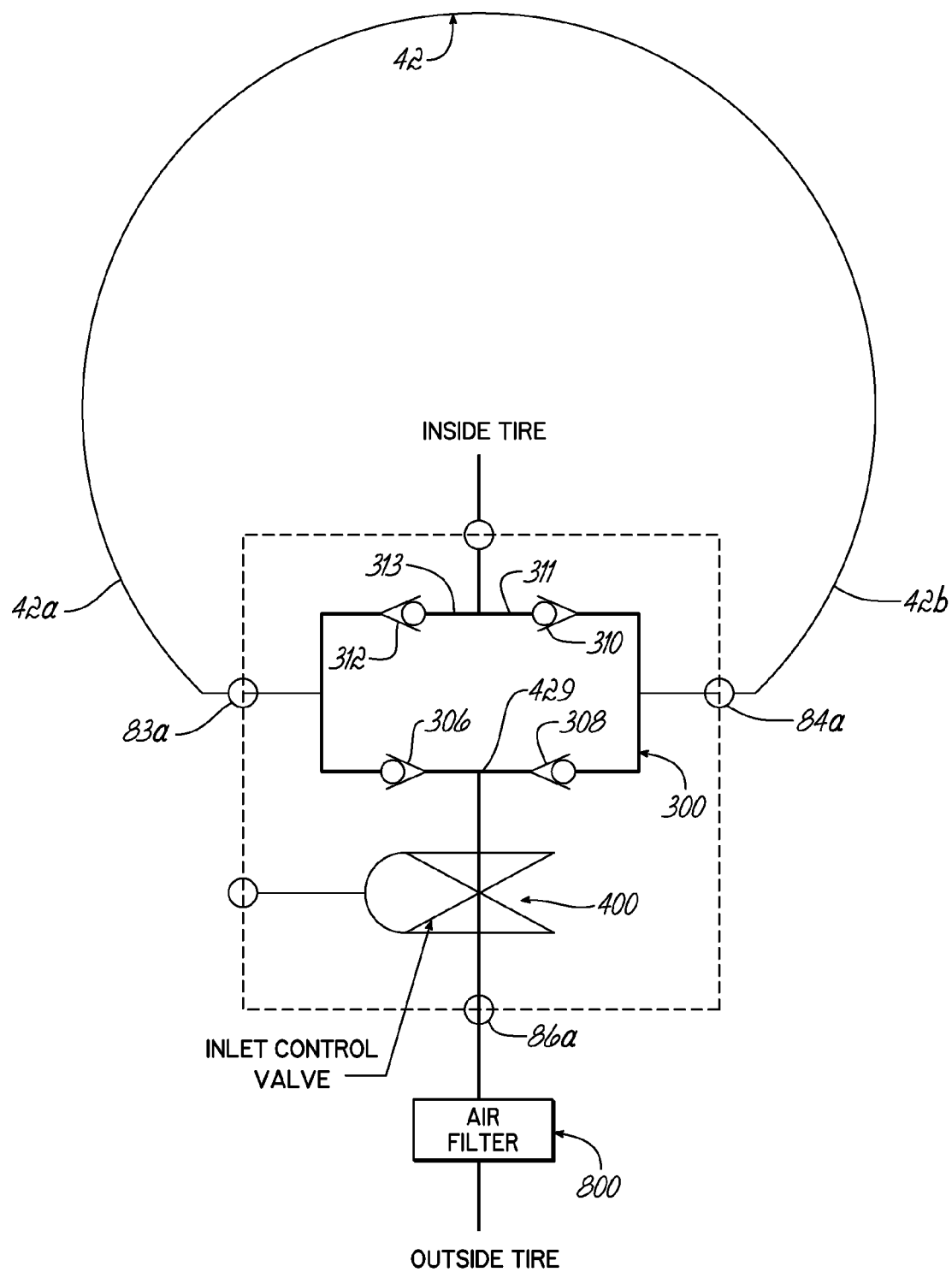
FIG. 7 is a schematic of the compact valve system and pump of the present invention.
Figure 8:
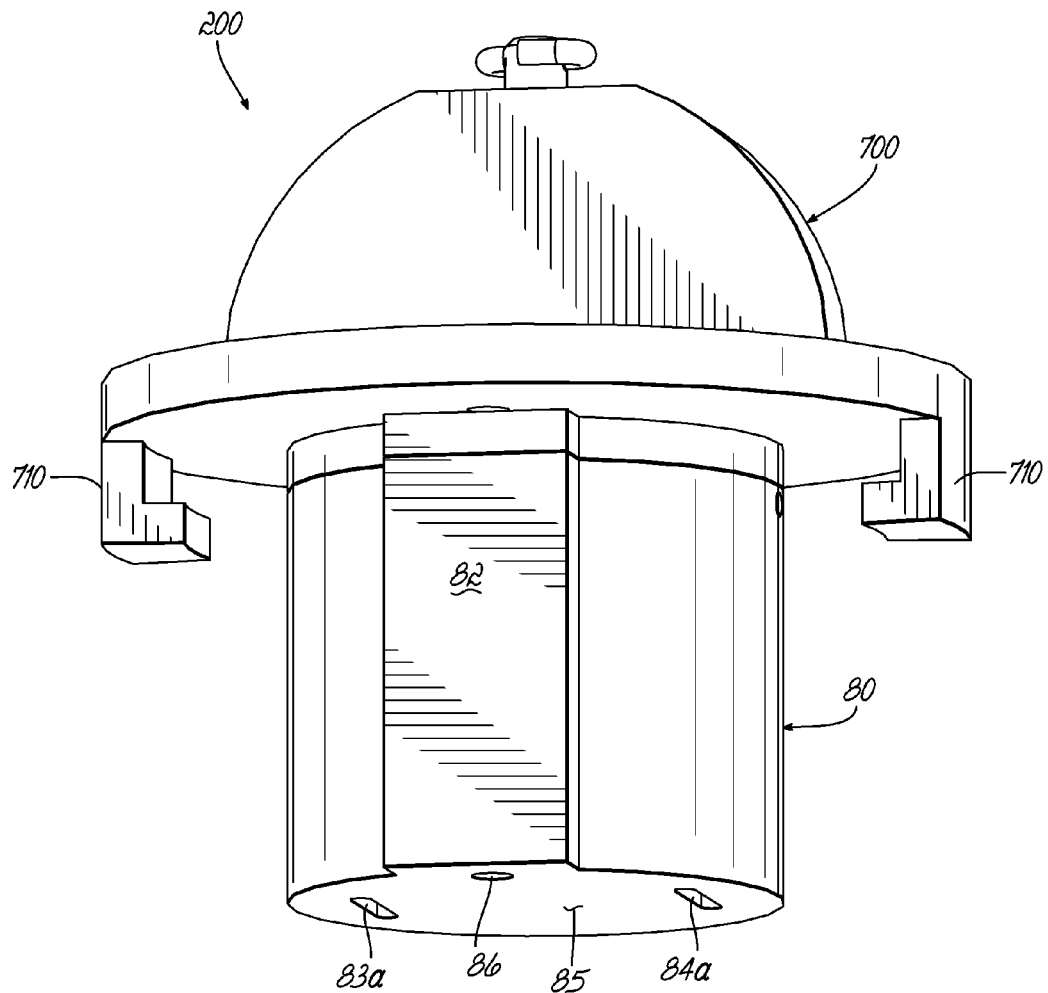
FIG. 8 is a side perspective view of the compact valve system, shown with the insert removed.

FIG. 7 illustrates a schematic of the tire assembly 10 including the flow controller and its relation to the pump 42 and inlet control valve 400. The inlet control valve 400 controls whether outside filtered air is permitted to enter the system. If air is needed, the inlet control valve 400 opens and allows air to enter the directional controller 300. The fluid flows through directional control valve 306. The flow then enters into the pump inlet 42a and is pumped through the tire to the pump outlet 42b. The anti return or check valve 308 blocks the pumped flow from entering the inlet control valve. The pumped air is routed through check valve 310 and then into the tire cavity. If the tire is rotating in the opposite direction, air enters pump end 42b through directional valve 308, is directed into the pump end 42a and then through valve 312 into tire cavity, where the anti return valve 306 prevents backflow of pumped air into the valve system.

Filter Assembly

The filter assembly 800 is configured to be mounted on the outside of the tire. The filter assembly is shown having a circular cross-sectional shape with a hard plastic exterior that is shown mounted in the lower sidewall area near the bead. The filter assembly 800 has an interior section 802 filled with porous media 804 suitable for filtering air. The filter assembly 800 has an inlet 810 to receive ambient air. Air travels through the inlet 810 and into the interior section 802 where the air is filtered by the porous media 804. The air exits the outlet 812 of the interior section and into passageway 814 that extends through a male fitting 816. The male fitting 816 is aligned for connection with aligned holes 86 of the retainer and hole 86a of the insert.

System Operation

Figure 6:
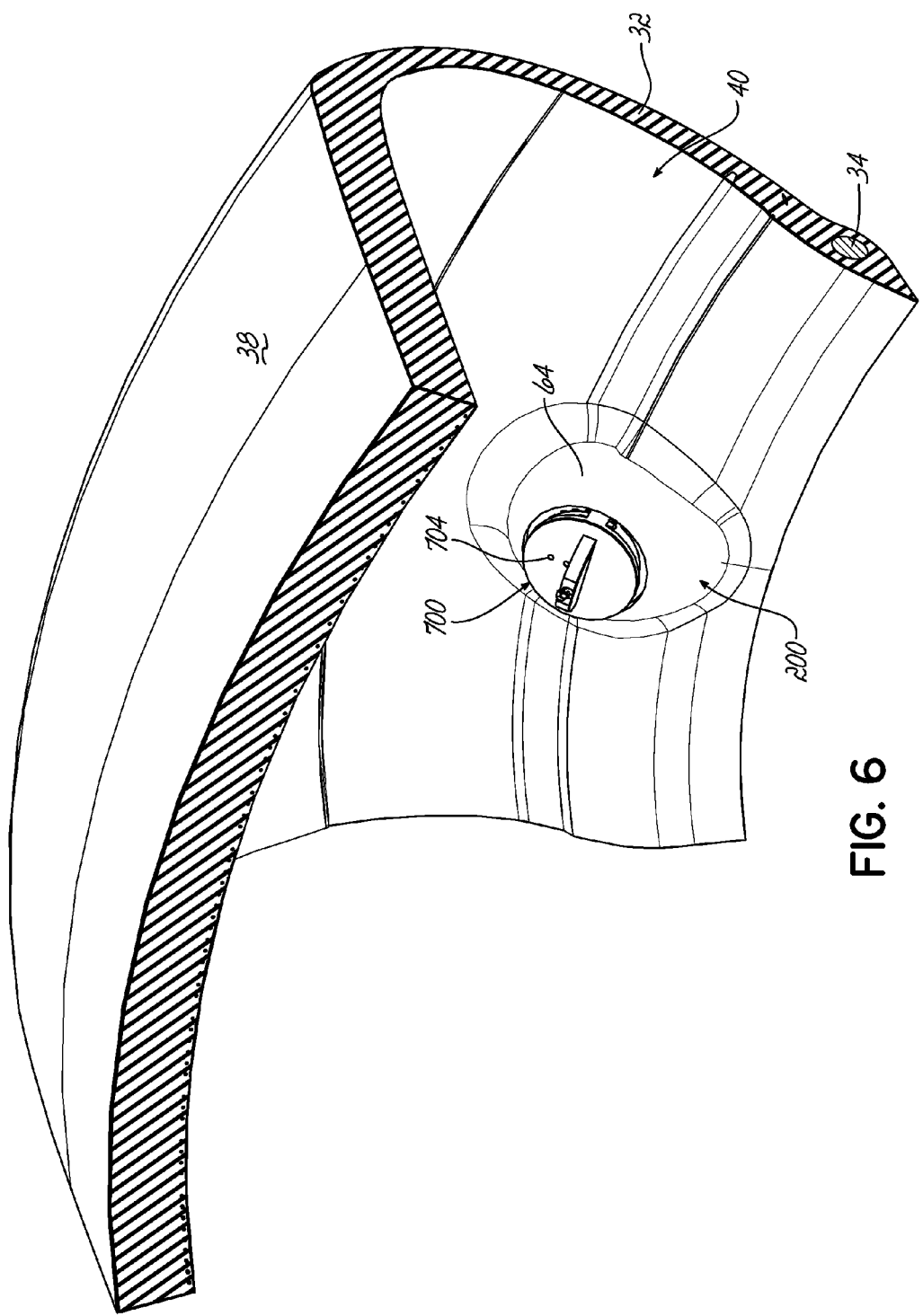
FIG. 6 is a side perspective view of the compact valve system as viewed from inside the tire.

The compact valve system 200 controls the flow of air into the pump system. As shown in FIGS. 6 and 14, the tire cavity pressure is communicated to an outer side of the diaphragm 404 via holes 704, 502, 408. As shown in FIG. 14B, the tire cavity pressure acts on the diaphragm 404, which seats the diaphragm against the central port 94 so that no air can enter into the compact valve system. The spring 475 counteracts the tire cavity pressure, biasing the diaphragm and the control plate in the open position. The spring 475 is selected to have a set trigger pressure, so that if the tire cavity pressure falls below the trigger pressure, the spring biases the diaphragm away from the central port 94 into the open position. Filtered outside air enters the compact valve system 200 via hole 86a, as shown in FIG. 14D.

After the air enters the compact valve system 200 via hole 86a, the filtered air is routed through angled channel 86b into location 86c of the retainer 80 as shown in FIGS. 10E and 10B. Flow from location 86c of the retainer is then routed to hole 88 and then into chamber 324 of the flow controller 300 as shown in FIG. 14C. The filtered air is then routed through port 434 of the inlet control valve and into the inlet control valve interior chamber 403. The air then passes from the interior chamber 403 into the central port 94 if the diaphragm is in the open position. Next the flow is routed through passageway 85a/b/c and into chamber 326. Chamber 326 routs the flow to passageway 429, which is in fluid communication with the pump inlets 426,428 of FIG. 13D. As shown in FIG. 14B, the flow exits the inlet control valve through port 426, through directional control valve 306 and into chamber 307. The flow exits hole 83a of the retainer and into the pump end 42a. The air is pumped through the pump passageway 42 as the tire rotates in a first direction.

Figure 2:
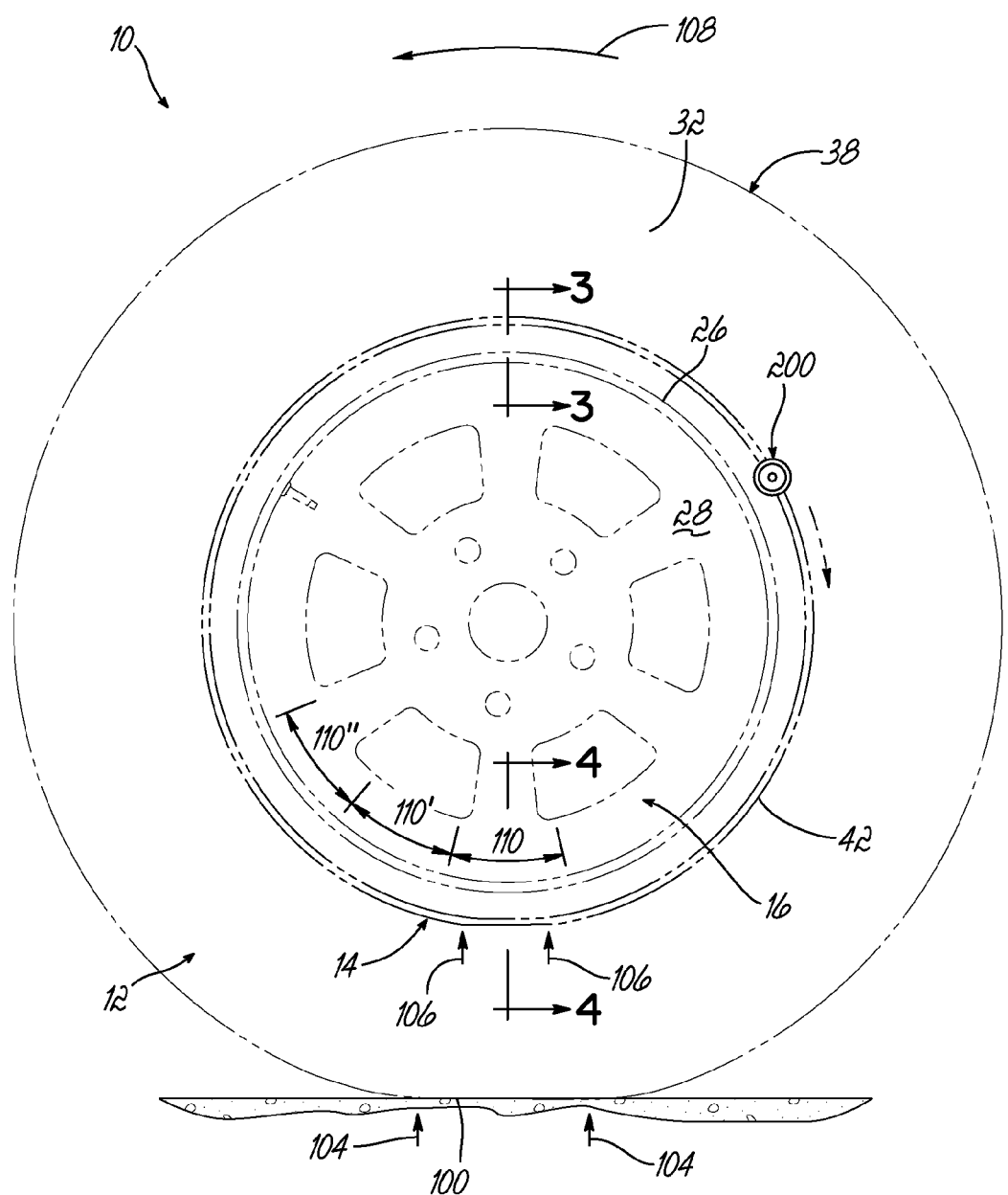
FIG. 2 illustrates the tire and wheel assembly of FIG. 1 in operation during tire rotation.

As will be appreciated from FIG. 2, air pump 42 is shown as a 360 degree pump, with the inlet 42a and outlet 42b co-located. As the tire rotates in a direction 109, a footprint 100 is formed against the ground surface. A compressive force 104 is directed into the tire from the footprint 100 and acts to flatten a segment 110 of the pump 42 a as shown at numeral 106. Flattening of the segment 110 of the pump 42 forces a portion of air located between the flattened segment 110 and the compact valve system 200, towards the compact valve system 200. As the tire continues to rotate in direction 108 along the ground surface 98, the pump tube 42 will be sequentially flattened or squeezed segment by segment 110, 110', 110" in a direction opposite to the tire rotation 108. The sequential flattening of the pump tube 42 segment by segment causes the column of air located between the flattened segments to be pumped to the pump outlet 42b.

The pumped air from outlet 42b enters the compact valve system 200 via slot 84a as shown in FIG. 14b. The check valve 308 blocks flow from entering chamber 309. The pumped air travels from slot 84a through channel 84b to port 84c as shown in FIG. 10E. The pumped air flows from location 84c is then directed through port 90 of upper plate 87 as shown in FIG. 14D. As shown in FIG. 14D, the pumped air flows through check valve 312 into chamber 313, and then exits the inlet control valve via channel 460 connected to outlet 470 of the inlet control valve, and then through aligned holes 504 of inner cap and 706 of lid into the tire cavity as shown in FIG. 14D. The tire will be pumped with air from the pump and inlet control valve assembly 200 until the tire pressure exceeds the trigger pressure. If the tire pressure exceeds the trigger pressure, the diaphragm will overcome the spring force and seat over central port 94, and block air from entering the pump system.

If the direction of the tire rotation is reversed, the pump and inlet control valve system will work bidirectionally, as described above except for the following differences. Filtered air will enter the system into the inlet control valve chamber 403. If the tire cavity needs air, the diaphragm will unseat from central port 94. The pumps will suck air from elongated slot 429 and then enter through check valve 308 into chamber 309 and then exit through hole 84a into pump 42b. The pumped air will enter the compact valve system 200 through hole 83a. The check valve 306 will block the flow from entering chamber 307. The retainer will channel the pumped air through channel 83b into hole 83c as shown in FIG. 10E. As shown in FIG. 14D, from location 83c the pumped air passes through port 89 of retainer, through directional valve 310 into chamber 311 and into annular passageway 460 of the inlet control housing 402. Flow from annular passageway 460 is routed to channel 470 as shown in FIG. 14D. Flow exits into the cavity via aligned holes 470, 504, 706.

As described above, the pump assembly may be positioned in the tire sidewall, radially outward of the rim flange surface 26 in the chafer 120. So positioned, the air tube 42 is radially inward from the tire footprint 100 and is thus positioned to be flattened by forces directed from the tire footprint as described above. The segment that is opposite the footprint 100 will flatten from the compressive force 106 from the footprint 100 pressing the tube segment against the rim flange surface 26. Although the positioning of the tube 42 is specifically shown as between a chafer 120 of the tire at the bead region 34 and the rim surface 26, it is not limited to same, and may be located at any region which undergoes compression, such as anywhere in the sidewall or tread.

From the forgoing, it will be appreciated that the subject invention may be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire having a pump and valve assembly comprising:
   a. the tire having a tire cavity, and a first and second sidewall extending respectively from first and second tire bead regions to a tire tread region;
   b. the valve assembly having a valve housing having an interior chamber, wherein a diaphragm is mounted in the interior chamber, and wherein the diaphragm has a first side in fluid communication with the tire cavity and a second side in fluid communication with the interior chamber;
   c. said pump having a pump passageway having a first and second end, wherein the pump passageway is positioned in the tire to open and close as the tire rotates;
   d. said interior chamber having an inlet chamber in fluid communication with the outside air, and a central port in fluid communication with the first and second end of the pump passageway,
   e. said diaphragm positioned over the central port and operative to open and close said central port;
   f. wherein a spring is positioned in the interior chamber of the valve housing, and operative to bias the diaphragm in an open position; and
   g. wherein the pump is in fluid communication with the tire cavity.

2. The tire of claim 1 wherein a one way valve is positioned downstream of the outlet of the central port and upstream of the first end of the pump passageway.

3. The tire of claim 1 wherein a one way valve is positioned between the pump first end and the tire cavity.

4. The tire of claim 1 wherein a one way valve is positioned between the pump second end and the tire cavity.

5. The tire of claim 1 wherein a one way valve is positioned between the pump second end and the outlet of the central port.

6. The tire of claim 1 wherein a filter assembly is in fluid communication with the inlet chamber of the valve assembly.

7. The tire of claim 1 wherein a control plate having an upper surface is positioned against the second side of the diaphragm, and wherein the spring engages the control plate.

8. A tire having a bidirectional pump and valve assembly comprising:
   a. the tire having a tire cavity, and a first and second sidewall extending respectively from first and second tire bead regions to a tire tread region;
   b. said tire having a pump passageway, said pump passageway having a first end and a second end and being operative to allow a portion of the pump passageway to substantially close and open the pump passageway when the tire is rotated in a first direction or second direction opposite said first direction,
   c. the valve assembly having a valve housing and an interior chamber, wherein a diaphragm is mounted in the interior chamber, and wherein the diaphragm has a first side in fluid communication with the pressure of the tire cavity;
   d. said interior chamber having an inlet chamber in fluid communication with the outside air, and a central port in fluid communication with a first chamber and a second chamber;
   e. wherein said diaphragm is positioned over the central port and operative to open and close the central port;
   f. wherein a resilient member biases the diaphragm into the open position;
   g. wherein said first chamber has a one way valve positioned therein, and an outlet of said first chamber is in fluid communication with the pump passageway first end;
   h. wherein said second chamber has a one way valve positioned therein, and an outlet of the second chamber is in fluid communication with the pump passageway second end;
   i. Wherein the valve housing further includes a third chamber, wherein the third chamber is in fluid communication with the pump first end and the tire cavity; and
   j. Wherein a one way valve is positioned in the third chamber, wherein the third chamber is located between the pump first end and the tire cavity.

9. The tire of claim 8 wherein the valve housing has a fourth chamber in fluid communication with a pump passageway first end, said fourth chamber has a one way valve positioned therein, wherein an outlet of the fourth chamber is in fluid communication with the tire cavity.

10. The tire of claim 8 wherein the one way valve of the first chamber prevents flow from entering the interior chamber.

11. The tire of claim 8 wherein the one way valve of the second chamber prevents flow from entering the interior chamber.

12. The tire of claim 8 wherein the one way valve of the third chamber prevents flow from the tire cavity from entering the pump passageway.

13. The tire of claim 8 wherein the one way valve of the fourth chamber prevents flow from the tire cavity from entering the pump passageway.

14. The tire of claim 8 wherein a filter is positioned between the outside air and the third hole.

15. The tire of claim 8 wherein the valve housing has an annular passageway which routes flow from an outlet of the third chamber to an outlet of the fourth chamber.

16. The tire of claim 8 wherein the valve housing has a semicircular passageway which routes flow from the central port to the inlet of the first and second chamber.

17. The tire of claim 8 wherein the bottom of the valve housing has a plurality of grooves.

18. The tire of claim 8 wherein the valve housing has an upper plate, and a bottom of the housing having one or more grooves, wherein the upper plate seats over the grooves forming one or more passageways which route flow from one location to another.

* * * * *